United States Patent
Xiong et al.

(10) Patent No.: US 10,299,239 B2
(45) Date of Patent: May 21, 2019

(54) CAPABILITY EXPOSURE IMPLEMENTATION METHOD AND SYSTEM, AND RELATED DEVICE

(71) Applicant: HUAWEI TECHNOLOGIES CO., LTD., Shenzhen, Guangdong (CN)

(72) Inventors: Chunshan Xiong, Beijing (CN); Xiaoyan Shi, Shenzhen (CN); Qianghua Zhu, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/988,019

(22) Filed: May 24, 2018

(65) Prior Publication Data

US 2018/0270780 A1 Sep. 20, 2018

Related U.S. Application Data

(63) Continuation of application No. PCT/CN2015/095940, filed on Nov. 30, 2015.

(51) Int. Cl.
*H04L 29/06* (2006.01)
*H04W 60/04* (2009.01)
(Continued)

(52) U.S. Cl.
CPC .............. *H04W 60/04* (2013.01); *H04L 29/00* (2013.01); *H04W 4/00* (2013.01); *H04W 8/22* (2013.01); *H04W 24/10* (2013.01); *H04L 67/42* (2013.01)

(58) Field of Classification Search
CPC .................................................... H04W 60/04
See application file for complete search history.

(56) References Cited

U.S. PATENT DOCUMENTS 9,397,878 B2 * 7/2016 Seth ...................... H04W 4/203
2005/0273668 A1 * 12/2005 Manning ................. H04L 12/66
714/39
(Continued)

FOREIGN PATENT DOCUMENTS

CN 101431425 A 5/2009
CN 102624939 A 8/2012
(Continued)

OTHER PUBLICATIONS

International Search Report issued in International Application No. PCT/CN2015/095940 dated Jul. 12, 2016, 12 pages.
(Continued)

*Primary Examiner* — Gary Lafontant
(74) *Attorney, Agent, or Firm* — Fish & Richardson P.C.

(57) ABSTRACT

A capability exposure implementation method and system, and a related device are provided. A method embodiment of the present disclosure includes: obtaining capability information of a radio access network device, configuring an API, and setting a use time limit of the API, where the API is used to provide the capability information for a second mobile edge platform; triggering a registration function to send registration information to the second mobile edge platform, where the registration information includes an identifier of the API; receiving an API request sent by the second mobile edge platform, where the API request includes the identifier of the API; detecting whether the use time limit of the API expires; and if the use time limit of the API does not expire, sending an API response to the second mobile edge platform by using the API, where the API response includes the capability information.

20 Claims, 17 Drawing Sheets

(51) Int. Cl.
*H04L 29/00* (2006.01)
*H04W 4/00* (2018.01)
*H04W 8/22* (2009.01)
*H04W 24/10* (2009.01)

(56) References Cited

U.S. PATENT DOCUMENTS

| | | |
|---|---|---|
| 2012/0196601 A1 | 8/2012 | Lundqvist et al. |
| 2013/0232540 A1* | 9/2013 | Saidi .................. G06F 21/6218 726/1 |
| 2015/0055623 A1 | 2/2015 | Li et al. |
| 2018/0035360 A1* | 2/2018 | Rasanen ................ H04W 8/06 |
| 2018/0159765 A1* | 6/2018 | Shi ....................... H04W 40/02 |

FOREIGN PATENT DOCUMENTS

| | | |
|---|---|---|
| EP | 2146475 A1 | 1/2010 |
| WO | 03026319 A2 | 3/2003 |

OTHER PUBLICATIONS

Extended European Search Report issued in European Application 15909451.5 dated Sep. 4, 2018, 7 pages.

* cited by examiner

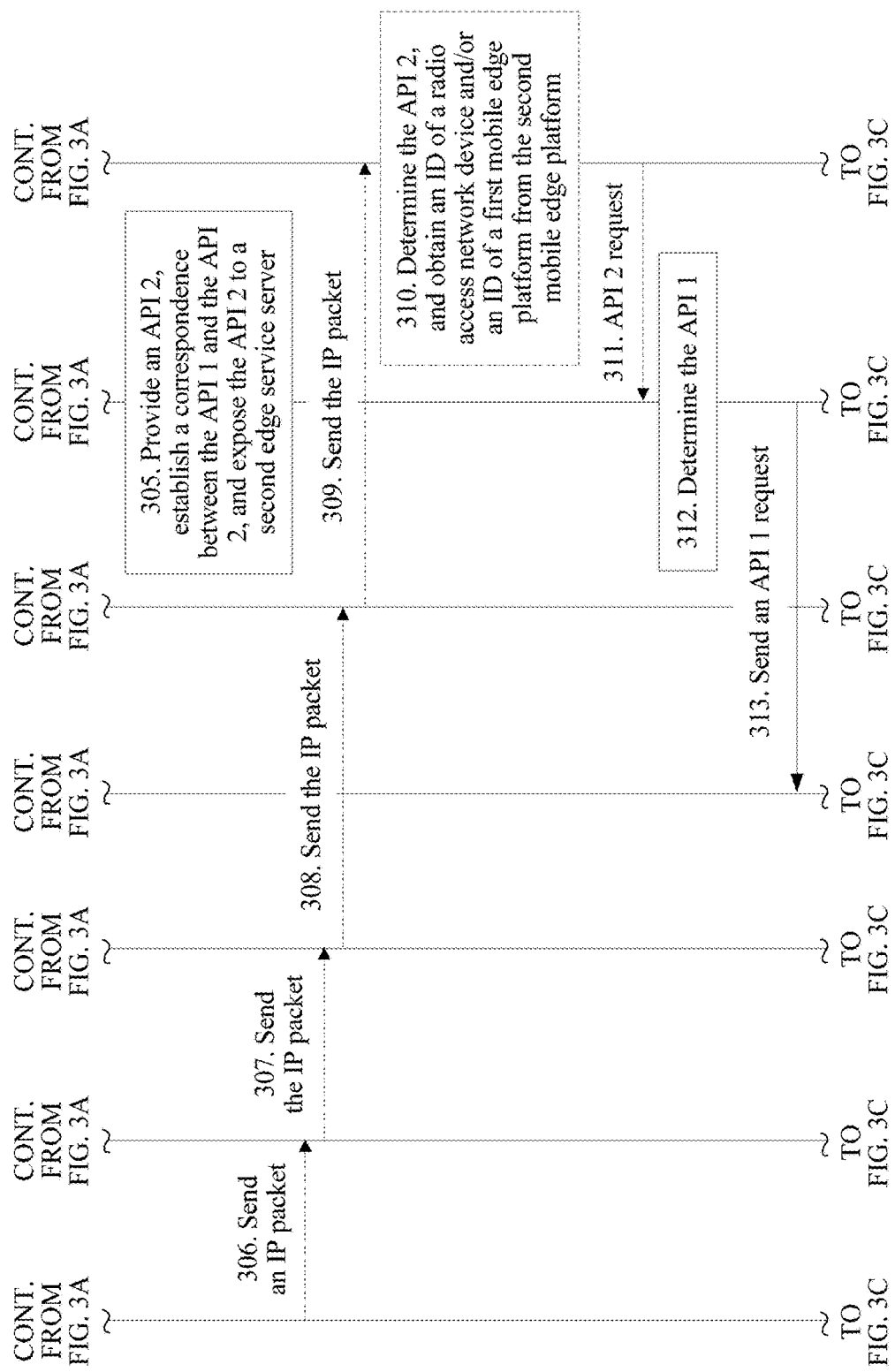

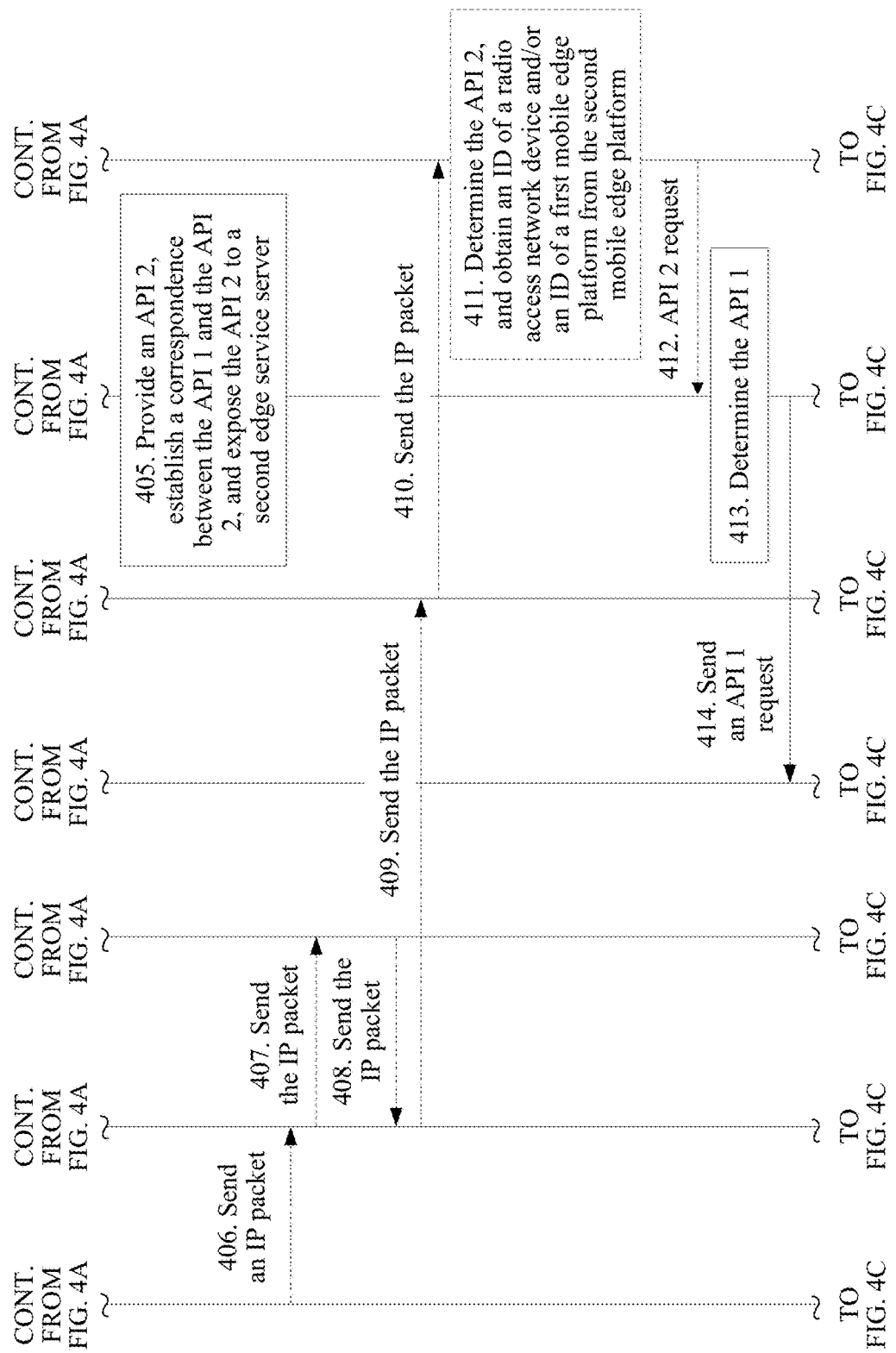

CAPABILITY EXPOSURE IMPLEMENTATION METHOD AND SYSTEM, AND RELATED DEVICE

CROSS-REFERENCE TO RELATED APPLICATIONS

This application is a continuation of International Application No. PCT/CN2015/095940, filed on Nov. 30, 2015, the disclosure of which is hereby incorporated by reference in its entirety.

TECHNICAL FIELD

The present invention relates to the field of wireless communications technologies, and specifically, to a capability exposure implementation method and system, and a related device.

BACKGROUND

A Mobile Edge Computing (MEC) server provides an information technology (IT) service environment and a cloud computing capability on a radio access network (RAN) close to a mobile subscriber, and creates a highly distributed environment for deploying applications and services. FIG. 1 is a schematic diagram of an application of an MEC server in the prior art. In FIG. 1, the MEC server includes an underlying infrastructure, a mobile edge platform, and an edge service server. The underlying infrastructure includes an MEC hardware resource layer and an MEC virtualization layer. The mobile edge platform is a core of the MEC server, and includes an MEC virtual management layer (for example, IaaS) and an MEC application service platform. A location of the MEC virtual management layer is selectable, and the MEC virtual management layer may be located at another location and is not implemented on the mobile edge platform. The MEC application service platform is configured to provide a data routing (Traffic Offload Function, TOF for short) service, a radio network information service (RNIS), a communication service, a registration service, and the like. On the mobile edge platform, a registration service module exposes the TOF service, the RNIS, and the like to an MEC application (Application, APP for short) program in a virtual machine (Virtual Machine, VM for short) of the edge service server for use.

Currently, a location of an MEC server is mostly considered during deployment of the MEC server. For example, there are three deployment scenarios in the prior art: In a first deployment scenario, the MEC server is deployed on an eNodeB side of Long Term Evolution (LTE), and one MEC server is deployed on one eNodeB side; in a second deployment scenario, the MEC server is deployed on a convergence node of LTE or $3^{rd}$ Generation (The 3rd Generation Telecommunication, 3G for short), and a plurality of base stations may share one MEC server; in a third deployment scenario, the MEC server is deployed on a 3G radio network controller (RNC), and a plurality of base stations may share one MEC server. The MEC servers in the first deployment scenario and the third deployment scenario are deployed on a radio access network side, so as to reduce a delay, optimize system performance, and improve quality of experience (QoE) of a user. The MEC server in the second deployment scenario is deployed on an upper-layer node of a radio access network, for example, a 3G convergence node, so as to support mobility. However, because only the location of the MEC server is considered in the foregoing three deployment manners, the deployment manners are not sufficiently flexible, and development and application of the MEC server are limited.

SUMMARY

Based on the foregoing descriptions, the present invention provides a capability exposure implementation method and system, and a related device, so as to implement more flexible deployment of an MEC server, and improve system performance.

A first aspect of the present invention provides a capability exposure implementation method, where the method may include:

obtaining, by a first mobile edge platform, capability information of a radio access network device, configuring an application programming interface API, and setting a use time limit of the API, where the API is used by the first mobile edge platform to provide the capability information for a second mobile edge platform;

triggering, by the first mobile edge platform, a registration function to send registration information to the second mobile edge platform, where the registration information includes an identifier of the API;

receiving, by the first mobile edge platform, an API request sent by the second mobile edge platform, where the API request includes the identifier of the API, and the API request is used to request the capability information from the first mobile edge platform;

detecting, by the first mobile edge platform, whether the use time limit of the API expires; and if the use time limit of the API does not expire, sending, by the first mobile edge platform, an API response to the second mobile edge platform by using the API, where the API response includes the capability information.

It can be learned that, in the first aspect of the present invention, deployment of cascaded mobile edge platforms is implemented (specifically implemented by deploying cascaded MEC servers), and the cascaded mobile edge platforms include the first mobile edge platform disposed on a radio access network side and the second mobile edge platform disposed on an upper-layer node of the radio access network. Based on the first mobile edge platform and the second mobile edge platform that are cascaded, because the first mobile edge platform is close to the radio access network device, the first mobile edge platform can obtain and store the capability information of the radio access network device. Then, the first mobile edge platform triggers the registration function to provide the capability information of the radio access network device for the second mobile edge platform (specifically, the first mobile edge platform provides the capability information of the radio access network device for the second mobile edge platform by using the API), so as to improve system performance and implement flexible service deployment, in addition to reducing processing load of the radio access network device.

Optionally, the capability information includes a channel signal state, cell load, terminal location information, network congestion, and a terminal identity.

Optionally, the identifier of the API may be a uniform resource locator (URL) or a uniform resource identifier (URI).

In some embodiments of the present invention, the capability exposure implementation method provided in the first aspect further includes: if the use time limit of the API expires, obtaining, by the first mobile edge platform, current capability information of the radio access network device, where the current capability information is capability information of the radio access network device at a current time; and resetting, by the first mobile edge platform, the use time limit of the API, and sending, by using the API, an API response including the current capability information to the second mobile edge platform.

In some embodiments of the present invention, the triggering, by the first mobile edge platform, a registration function to send registration information to the second mobile edge platform includes: sending, by the first mobile edge platform, the registration information to the second mobile edge platform.

In some embodiments of the present invention, the triggering, by the first mobile edge platform, a registration function to send registration information to the second mobile edge platform includes: triggering, by the first mobile edge platform, a management network element to send the registration information to the second mobile edge platform by using the management network element.

In some embodiments of the present invention, the capability exposure implementation method provided in the first aspect further includes: providing, by the first mobile edge platform, the capability information for a first edge service server by using the API, where the first edge service server and the first mobile edge platform are disposed in a first Mobile Edge Computing MEC server.

A second aspect of the present invention provides a capability exposure implementation method, where the method may include:

receiving, by a second mobile edge platform, registration information, where the registration information includes an identifier of an application programming interface API, the API is used by a first mobile edge platform to provide capability information for the second mobile edge platform, and the capability information is capability information of a radio access network device;

sending, by the second mobile edge platform, an API request to the first mobile edge platform, where the API request includes the identifier of the API, and the API request is used to request the capability information from the first mobile edge platform; and receiving, by the second mobile edge platform, an API response sent by the first mobile edge platform, where the API response includes the capability information.

It can be learned that, based on the cascaded mobile edge platforms described in the first aspect, after receiving the registration information, the second mobile edge platform requests, by sending an API request including the identifier that is of the API and that is in the registration information, the first mobile edge platform to obtain the capability information of the radio access network device, so as to share processing load of the radio access network device, improve system performance, and promote an application scope of the mobile edge platform (or an MEC server).

Optionally, the capability information includes a channel signal state, cell load, terminal location information, network congestion, and a terminal identity.

In some embodiments of the present invention, before the sending, by the second mobile edge platform, an API request to the first mobile edge platform, the method includes: receiving, by the second mobile edge platform, a trigger request sent by a second edge service server, where the trigger request includes an identity ID of the radio access network device and/or an ID of the first mobile edge platform, the trigger request is used to trigger the second mobile edge platform to send the API request to the first mobile edge platform, and the second edge service server and the second mobile edge platform are disposed in a second Mobile Edge Computing MEC server; and determining, by the second mobile edge platform, the API according to the identity ID of the radio access network device and/or the ID of the first mobile edge platform.

In some embodiments of the present invention, after the receiving, by the second mobile edge platform, an API response sent by the first mobile edge platform, the method includes: providing, by the second mobile edge platform, the capability information for the second edge service server.

In some embodiments of the present invention, the receiving, by a second mobile edge platform, registration information includes: receiving, by the second mobile edge platform, the registration information sent by the first mobile edge platform.

In some embodiments of the present invention, the receiving, by a second mobile edge platform, registration information includes: receiving, by the second mobile edge platform, the registration information sent by a management network element.

A third aspect of the present invention provides a mobile edge platform, where the mobile edge platform may include:

a processing module, configured to: obtain capability information of a radio access network device, configure an application programming interface API, and set a use time limit of the API, where the API is used by the mobile edge platform to provide the capability information for a second mobile edge platform; and a registration service module, configured to trigger a registration function to send registration information to the second mobile edge platform, where the registration information includes an identifier of the API.

The processing module is further configured to: receive an API request sent by the second mobile edge platform, where the API request includes the identifier of the API, and the API request is used to request the capability information from the mobile edge platform; detect whether the use time limit of the API expires; and when detecting that the use time limit of the API does not expire, send an API response to the second mobile edge platform by using the API, where the API response includes the capability information.

Optionally, the capability information includes a channel signal state, cell load, terminal location information, network congestion, and a terminal identity.

In some embodiments of the present invention, the processing module is further configured to: when detecting that the use time limit of the API expires, obtain current capability information of the radio access network device, where the current capability information is capability information of the radio access network device at a current time; and reset the use time limit of the API, and send, by using the API, an API response including the current capability information to the second mobile edge platform.

In some embodiments of the present invention, the registration service module is specifically configured to send the registration information to the second mobile edge platform.

In some embodiments of the present invention, the registration service module is further specifically configured to trigger a management network element to send the registration information to the second mobile edge platform by using the management network element.

In some embodiments of the present invention, the processing module is further configured to provide the capability information for a first edge service server by using the API, where the first edge service server and the mobile edge platform are disposed in a first Mobile Edge Computing MEC server.

A fourth aspect of the present invention provides a mobile edge platform, where the mobile edge platform may include:

a registration service module, configured to receive registration information, where the registration information includes an identifier of an application programming interface API, the API is used by a first mobile edge platform to provide capability information for the mobile edge platform, and the capability information is capability information of a radio access network device; and a processing module, configured to: send an API request to the first mobile edge platform, where the API request includes the identifier of the API, and the API request is used to request the capability information from the first mobile edge platform; and receive an API response sent by the first mobile edge platform, where the API response includes the capability information.

Optionally, the capability information includes a channel signal state, cell load, terminal location information, network congestion, and a terminal identity.

In some embodiments of the present invention, the processing module is further configured to: before sending the API request to the first mobile edge platform, receive a trigger request sent by a second edge service server, where the trigger request includes an identity ID of the radio access network device and/or an ID of the first mobile edge platform, the trigger request is used to trigger the mobile edge platform to send the API request to the first mobile edge platform, and the second edge service server and the mobile edge platform are disposed in a second Mobile Edge Computing MEC server; and determine the API according to the identity ID of the radio access network device and/or the ID of the first mobile edge platform.

In some embodiments of the present invention, the processing module is further configured to: after receiving the API response sent by the first mobile edge platform, provide the capability information for the second edge service server.

In some embodiments of the present invention, the processing module is specifically configured to receive the registration information sent by the first mobile edge platform.

In some embodiments of the present invention, the processing module is specifically configured to receive the registration information sent by a management network element.

A fifth aspect of the present invention provides an MEC server, where the MEC server may include the mobile edge platform provided in the third aspect or the mobile edge platform provided in the fourth aspect.

In some embodiments of the present invention, the MEC server provided in the fifth aspect may further include an edge service server, where the mobile edge platform is further configured to provide capability information of a radio access network device for the edge service server.

A sixth aspect of the present invention provides a capability exposure implementation system, where the capability exposure implementation system may include a first mobile edge platform and a second mobile edge platform, where the first mobile edge platform is the mobile edge platform provided in the third aspect, and the second mobile edge platform is the mobile edge platform provided in the fourth aspect.

In some embodiments of the present invention, the capability exposure implementation system provided in the sixth aspect further includes a radio access network device, where the radio access network device is configured to provide capability information for the first mobile edge platform.

In some embodiments of the present invention, the capability exposure implementation system provided in the sixth aspect further includes a terminal, where the terminal is configured to provide a data packet (IP packet).

A seventh aspect of the present invention further provides a capability exposure implementation system, where the capability exposure implementation system may include a radio access network device, a first Mobile Edge Computing MEC server, and a second MEC server, where the first MEC server is the MEC server provided in the fifth aspect, the second MEC server is the MEC server provided in the fifth aspect, the first MEC server includes the mobile edge platform provided in the third aspect, and the second MEC server includes the mobile edge platform provided in the fourth aspect.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 3A to FIG. 3C are a signaling diagram of a capability exposure implementation method according to some embodiments of the present invention;

FIG. 4A to FIG. 4C are another signaling diagram of a capability exposure implementation method according to some embodiments of the present invention;

DESCRIPTION OF EMBODIMENTS

Embodiments of the present invention provide a capability exposure implementation method, so as to implement deployment manners of cascaded MEC servers, that is, obtain capability information of a radio access network device, thereby reducing a delay, performing fast access, and improving QoE, and further providing mobility support. The embodiments of the present invention further provide a system, a mobile edge platform, and an MEC server that are corresponding to the capability exposure implementation method.

To make the invention objectives, features, and advantages of the present invention clearer and more comprehensible, the following describes the technical solutions in the embodiments of the present invention with reference to the accompanying drawings in the embodiments of the present invention. Apparently, the embodiments described are merely a part rather than all of the embodiments of the present invention. All other embodiments obtained by a person of ordinary skill in the art based on the embodiments of the present invention without creative efforts shall fall within the protection scope of the present invention.

In the specification, claims, and accompanying drawings of the present invention, the terms "first", "second", "third", "fourth", and so on are intended to distinguish between different objects but do not indicate a particular order. In addition, the terms "including", "including", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 1:
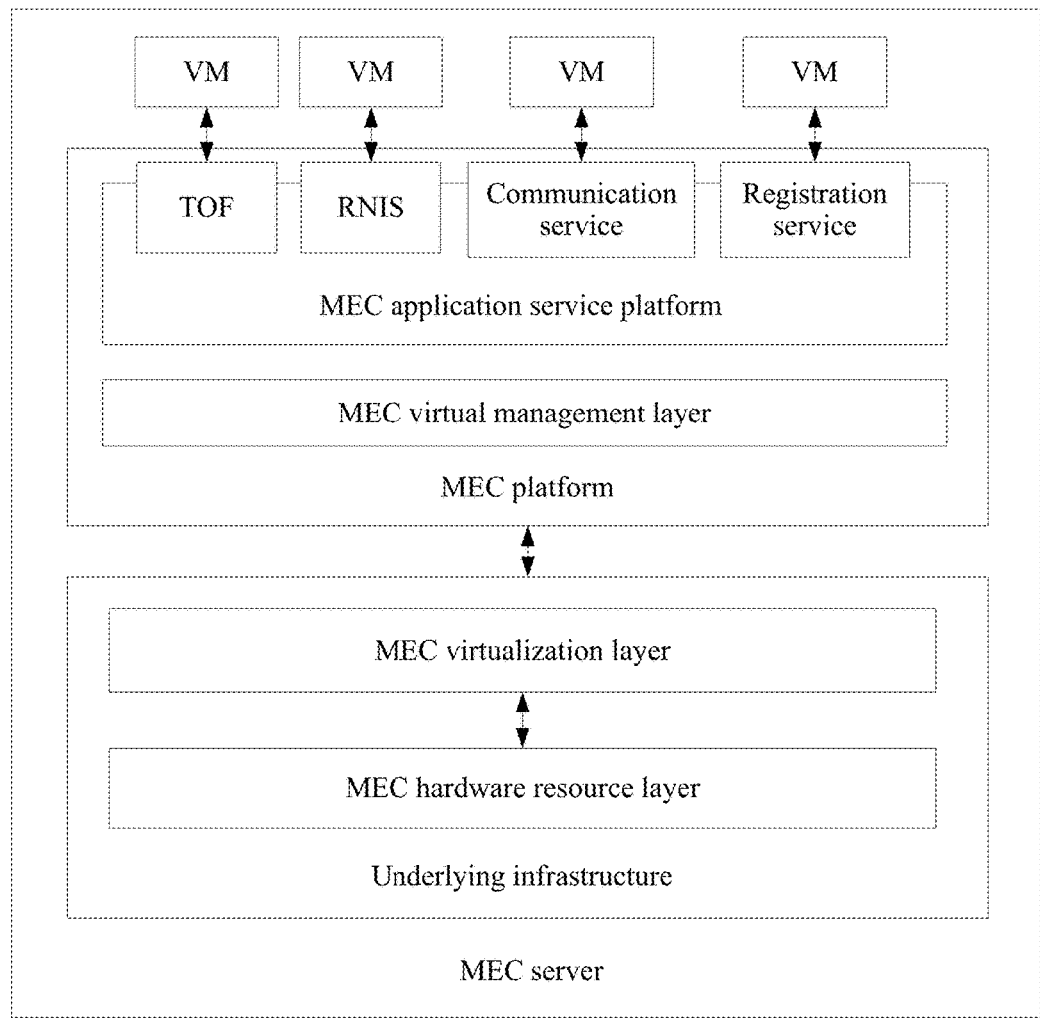
FIG. 1 is a schematic diagram of an architecture of an MEC server in the prior art.
Figure 2A:
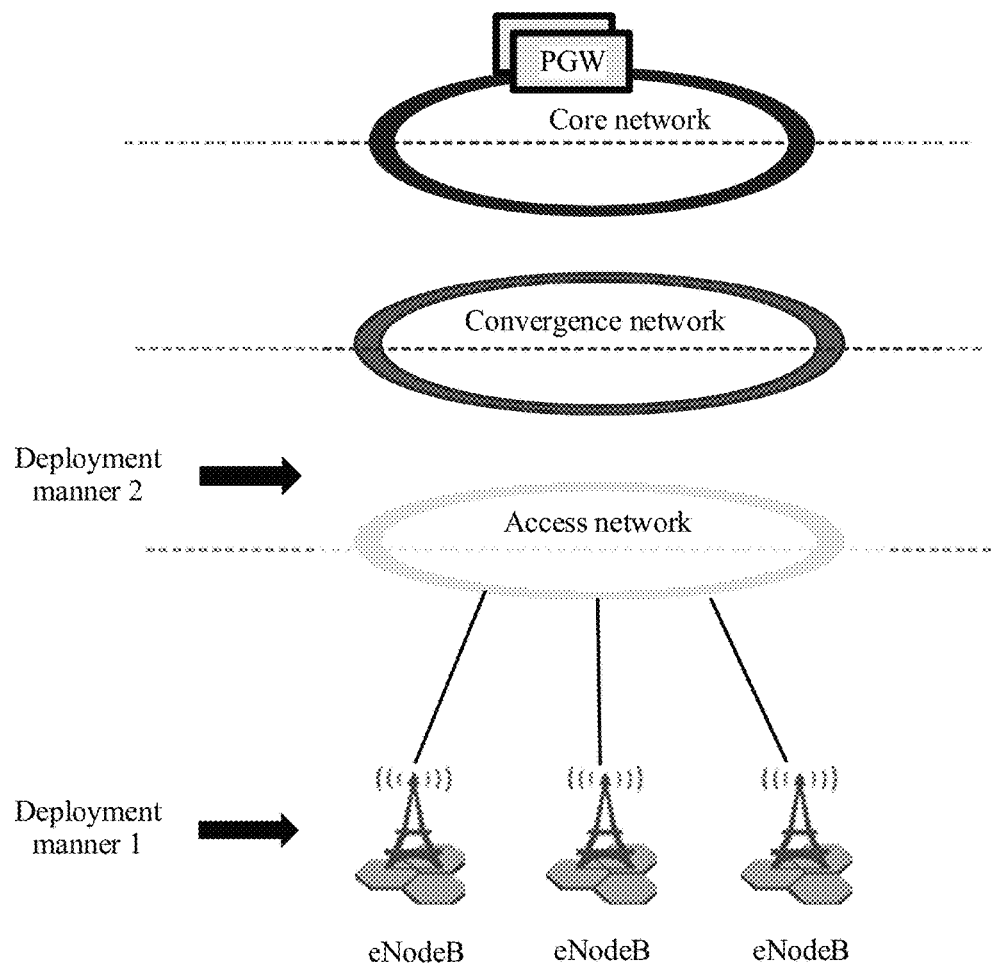
FIG. 2a is a schematic diagram of a deployment scenario of an MEC server in the prior art.

A common deployment manner of an MEC server is first described. Referring to FIG. 2a, FIG. 2a is a schematic diagram of a deployment scenario of an MEC server in the prior art. In FIG. 2a, the MEC server may be deployed on a radio access network side according to manner 1, that is, disposed on an S1-U interface close to a radio access network device. In FIG. 2a, that the radio access network device is an eNodeB is used as an example. In deployment manner 1, because the MEC server has a natural location advantage of being close to the radio access network device, the MEC server can obtain capability information of the radio access network device, so as to provide a localized innovation service with a low delay, fast access, and high bandwidth. Alternatively, the MEC server may be deployed on a node between a radio access network and a core network according to manner 2, for example, a convergence node of a convergence network in a 3G network. In deployment manner 2, the MEC server can support mobility of a base station.

However, in FIG. 2a, either deployment manner 1 or deployment manner 2 exists, that is, the MEC server is deployed in deployment manner 1 or the MEC server is deployed in deployment manner 2. Because a location of the MEC server is mainly considered during deployment, a deployment manner is relatively simple, flexibility is insufficient, and a function of the MEC server cannot be fully used to implement service deployment and improve an application scope of the MEC server.

Figure 2B:
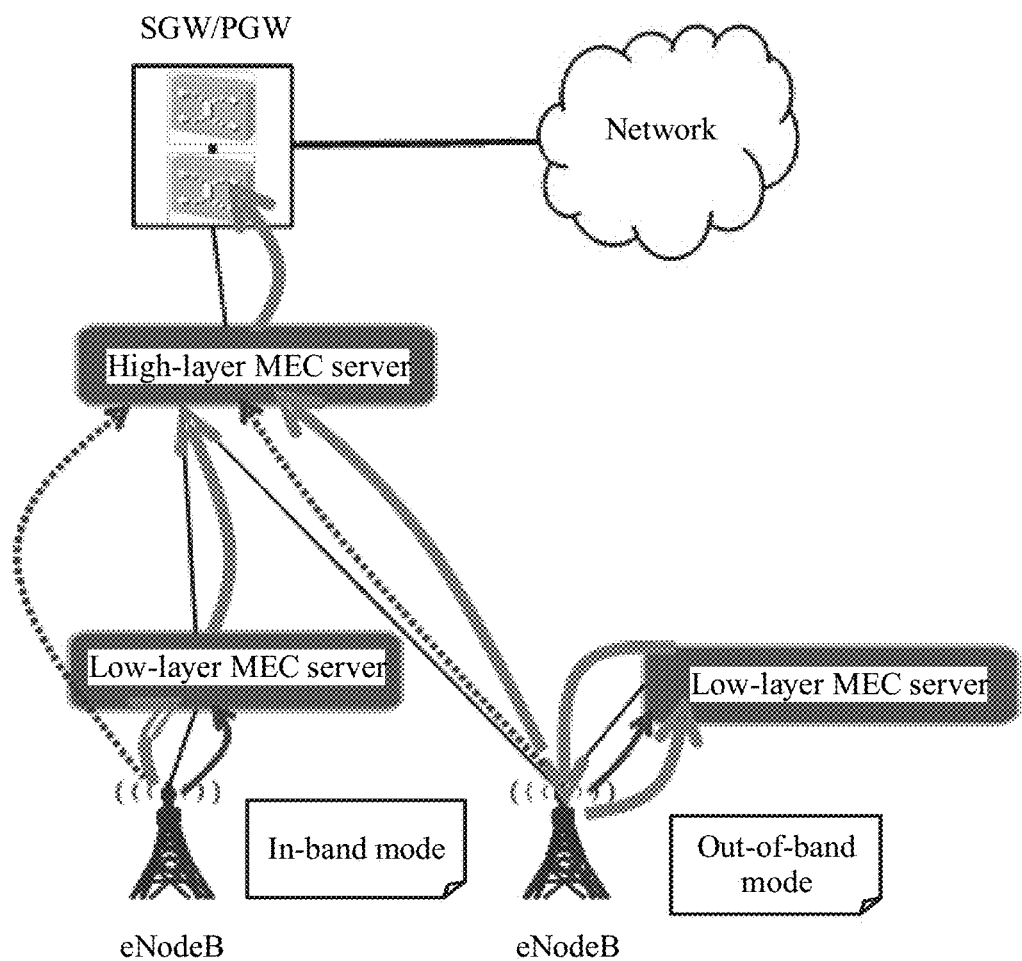
FIG. 2b is a deployment scenario of cascading MEC servers according to some embodiments of the present invention.

Based on a defect of the deployment manner of the MEC server in the prior art, deployment of cascaded MEC servers is implemented in an embodiment of the present invention. The cascaded MEC servers include two or more levels of MEC servers (in this embodiment of the present invention, that the two levels of MEC servers are used to implement the cascaded MEC servers is used as example for description). Referring to FIG. 2b, FIG. 2b is a deployment scenario of cascading MEC servers according to some embodiments of the present invention. In FIG. 2b, an MEC server deployed on a radio access network device (a base station (eNodeB) is used as an example in FIG. 2b) side is referred to as a low-layer MEC server (Low MEC), where the low-layer MEC server is a first MEC server in an embodiment of the present invention, and an MEC server deployed at a high layer (that is, a node between a radio access network and a core network. That upper-layer nodes include a serving gateway (SGW) and a packet data network gateway (PGW) is used as an example in FIG. 2b) is referred to as a high-layer MEC server (High MEC), where the high-layer MEC server is a second MEC server in an embodiment of the present invention. It is noted herein that the low-layer MEC server and the high-layer MEC server are described in subsequent embodiments of the present invention.

Figure 2C:
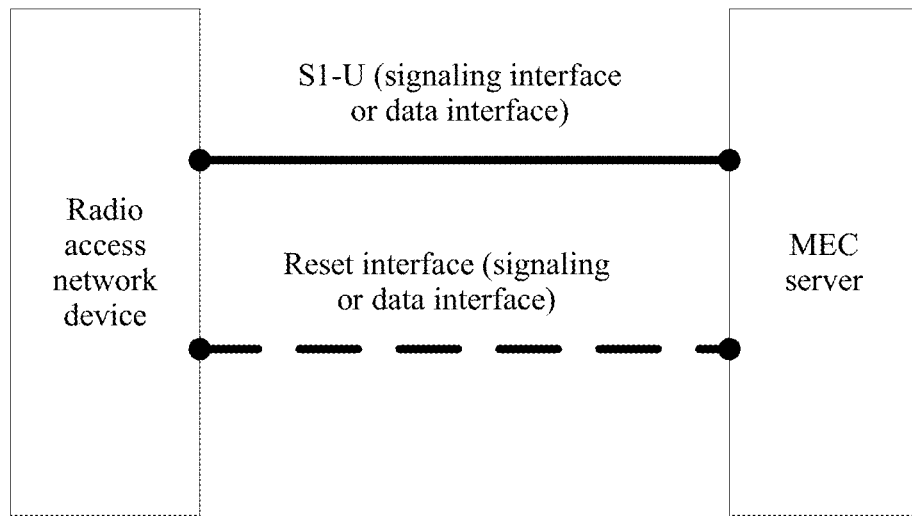
FIG. 2c is a schematic diagram of a communications interface for communication between an MEC server and a radio access network device according to an embodiment of the present invention.

It is further necessary to first describe herein an interface related to communication between an MEC server and a radio access network device. Referring to FIG. 2c, FIG. 2c is a schematic diagram of a communications interface for communication between an MEC server and a radio access network device according to an embodiment of the present invention. In FIG. 2c, there are two function interfaces between the MEC server and the radio access network device: One type is a data interface used to transmit data (an IP packet of UE) between the radio access network device and the MEC server; and the other type is a signaling interface used to transmit capability information between the radio access network device and the MEC server. The data interface is implemented in two manners: One type is to use an external interface (that is, reset an interface for use), and the other type is to directly use an S1-U interface. The signaling interface is also implemented in two manners: One type is to reuse the data interface (that is, the data interface is used as both the data interface and the signaling interface), and the other type is to use an external interface (that is, reset an interface).

With reference to FIG. 2c, when the high-layer MEC server is deployed in FIG. 2b, the low-layer MEC server may be deployed in two modes according to a location of the low-layer MEC server on a data plane: The first type is an in-band mode (On-path model), that is, the low-layer MEC server exists, and the low-layer MEC server directly communicates with the radio access network device by using the S1-U interface (transmits data by using the S1-U interface), where the IP packet may directly arrive at the high-layer MEC server after passing through the low-layer MEC server; and the second type is an out-of-band mode (Off-path model), that is, the low-layer MEC server exists, but resets the interface to transmit data. Compared with the in-band mode, in the out-of-band mode, the IP packet needs to be uploaded to the base station after arriving at the low-layer MEC server, so as to continue to forward the IP packet to the high-layer MEC server.

In the in-band mode and the out-of-band mode shown in FIG. 2*b*, capability information of the radio access network device can be exposed only to the low-layer MEC server, and cannot be exposed to the high-layer MEC server. The high-layer MEC server can use the capability information of the radio access network device only by using the low-layer MEC server (that is, the low-layer MEC server exposes the capability information of the radio access network device to the high-layer MEC server). Therefore, this deployment manner is referred to as a manner of cascading MEC servers, and is one of layered deployment manners. This deployment manner not only delivers excellent performance of deployment manner 1 and deployment manner 2 shown in FIG. 2*a* in the prior art, but also can reduce signaling information processed by the radio access network device, so as to reduce processing load of the radio access network device.

FIG. 2*b* shows only the deployment scenario in an EPS system. The cascaded MEC servers provided in this embodiment of the present invention may be further applied to a 2G network system, a 3G network system, a 4G network system, a 5G network system, and a future communications network. In the 2G network system, a low-layer MEC server disposed in a radio access network is close to a base station controller (BSC). In the 3G network system, a low-layer MEC server disposed in a radio access network is close to an RNC.

It is further noted that this embodiment of the present invention focuses on exposing the capability information of the radio access network device to the high-layer MEC server by using the low-layer MEC server, so that the capability information is exposed to an edge service server of the high-layer MEC server for use.

Figure 2D:
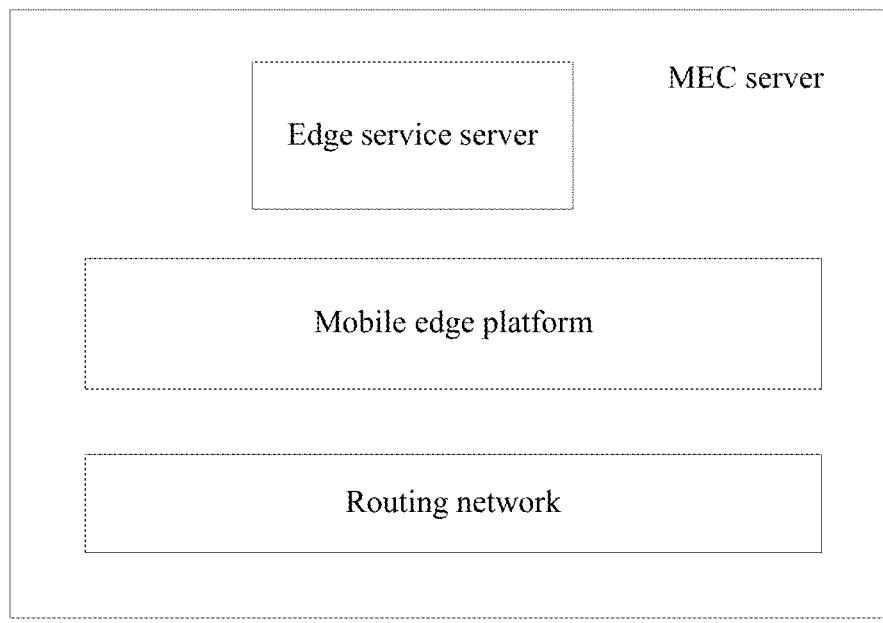
FIG. 2d is a diagram of internal architectures of cascaded MEC servers deployed based on FIG. 2b according to an embodiment of the present invention.

Referring to FIG. 2*d*, FIG. 2*d* is a diagram of an internal architecture of an MEC server according to an embodiment of the present invention. In FIG. 2*d*, the MEC server mainly includes a mobile edge platform, a routing network, and an edge service server. The routing network is configured to forward data (such as an IP packet) or signaling (such as a request for capability information collection and feedback of capability information). The mobile edge platform provides services such as a registration service, an RNIS, and a TOF service. The registration service, the RNIS, and the TOF service are dynamically generated capability information obtained from a radio access network device. With reference to FIG. 2*b*, the MEC server that is provided in FIG. 2*d* and that is deployed on an upper-layer node of a radio access network is used as a high-layer MEC server, and the MEC server that is provided in FIG. 2*d* and that is deployed on a radio access network side is used as a low-layer MEC server.

Figure 2E:
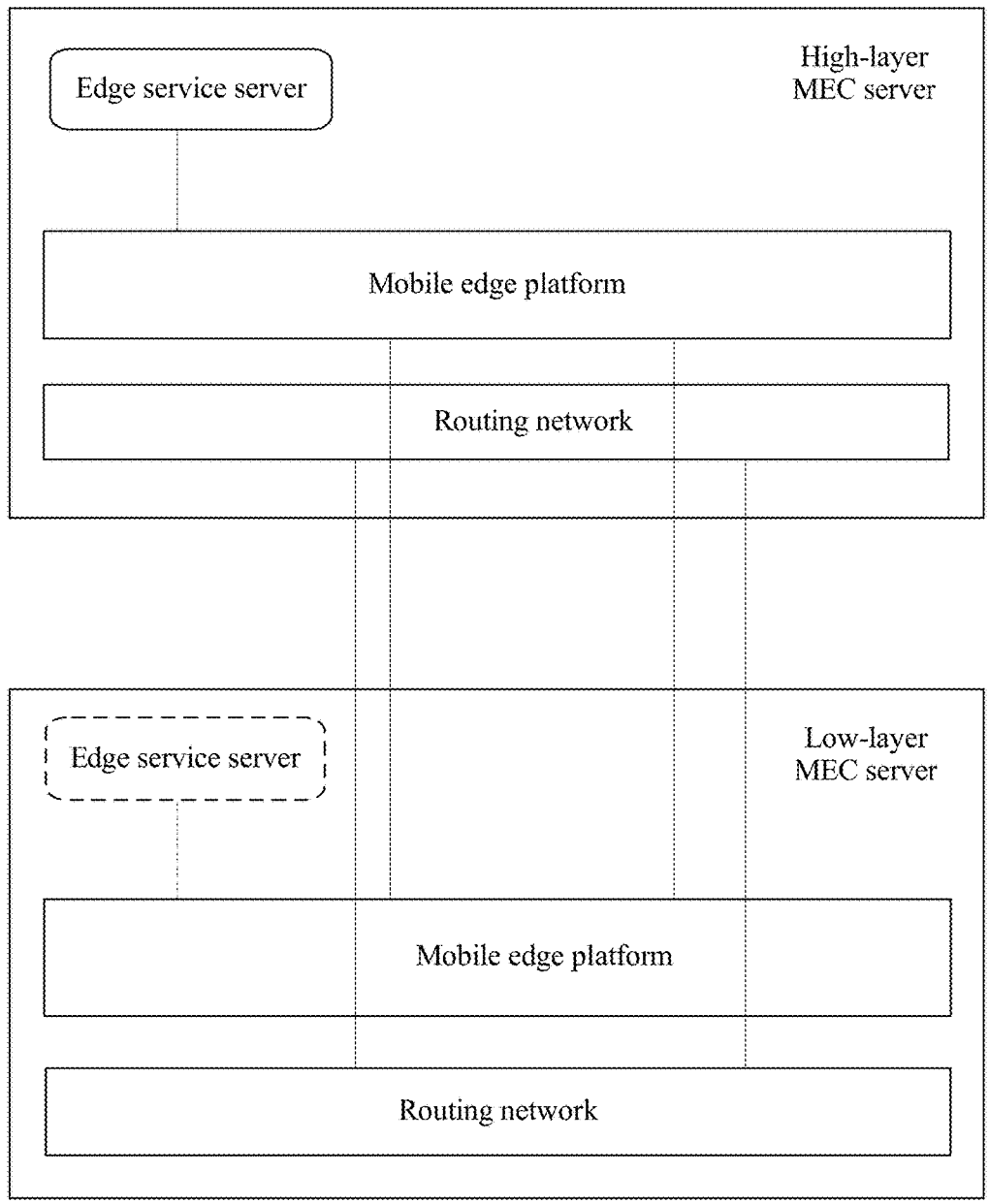
FIG. 2e is a diagram of an architecture of a capability exposure implementation system according to an embodiment of the present invention.

Referring to FIG. 2*e*, FIG. 2*e* is a diagram of an architecture of a capability exposure implementation system according to an embodiment of the present invention. In FIG. 2*e*, a mobile edge platform (a first mobile edge platform in an embodiment of the present invention) of a low-layer MEC server requests capability information from a radio access network device by using a routing network, the routing network forwards the capability information to the mobile edge platform, the mobile edge platform provides the capability information for a mobile edge platform (a second mobile edge platform in an embodiment of the present invention) of a high-layer MEC server, and then the mobile edge platform of the high-layer MEC server provides the capability information for an edge service server (an edge service server of the high-layer MEC server).

A data packet (an IP packet, where the packet includes a service request of a terminal, for example, a request for location positioning) sent by the terminal arrives at the routing network of the low-layer MEC server by using the radio access network device. If the low-layer MEC server is in the in-band mode, the routing network of the low-layer MEC server directly forwards the data packet to a routing network of the high-layer MEC server, and then the routing network of the high-layer MEC server forwards the data packet to the edge service server of the high-layer MEC server. If the low-layer MEC server is in the out-of-band mode, the routing network of the low-layer MEC server needs to upload the data packet to the radio access network device, the radio access network device sends the data packet to a routing network of the high-layer MEC server, and then the routing network of the high-layer MEC server forwards the data packet to the edge service server of the high-layer MEC server.

It may be understood that this embodiment of the present invention focuses on how to use the low-layer MEC server to expose the capability information of the radio access network device to the high-layer MEC server, and an MEC platform of an MEC server obtains and exposes the capability information. Therefore, when cascaded MEC servers are actually deployed, there is a special requirement for a location of a mobile edge platform of the MEC server only, and a routing network and an edge service server may be located at other locations, that is, a mobile edge platform needs to be deployed on a radio access network side and a mobile edge platform needs to be deployed on an upper-layer node of a radio access network. Generally, cascaded mobile edge platforms are actually implemented. However, because mobile edge platforms belong to different MEC servers, it is equivalent to the fact that the cascaded MEC servers are deployed.

It should be noted that one high-layer MEC server may be corresponding to a plurality of low-layer MEC servers. In addition, in a low-layer MEC server, a mobile edge platform further provides capability information for an edge service server of the low-layer MEC server. However, this technology is the prior art, and is not described in detail herein.

The following describes in detail the technical solutions of the present invention by using specific embodiments.

Figure 3A:
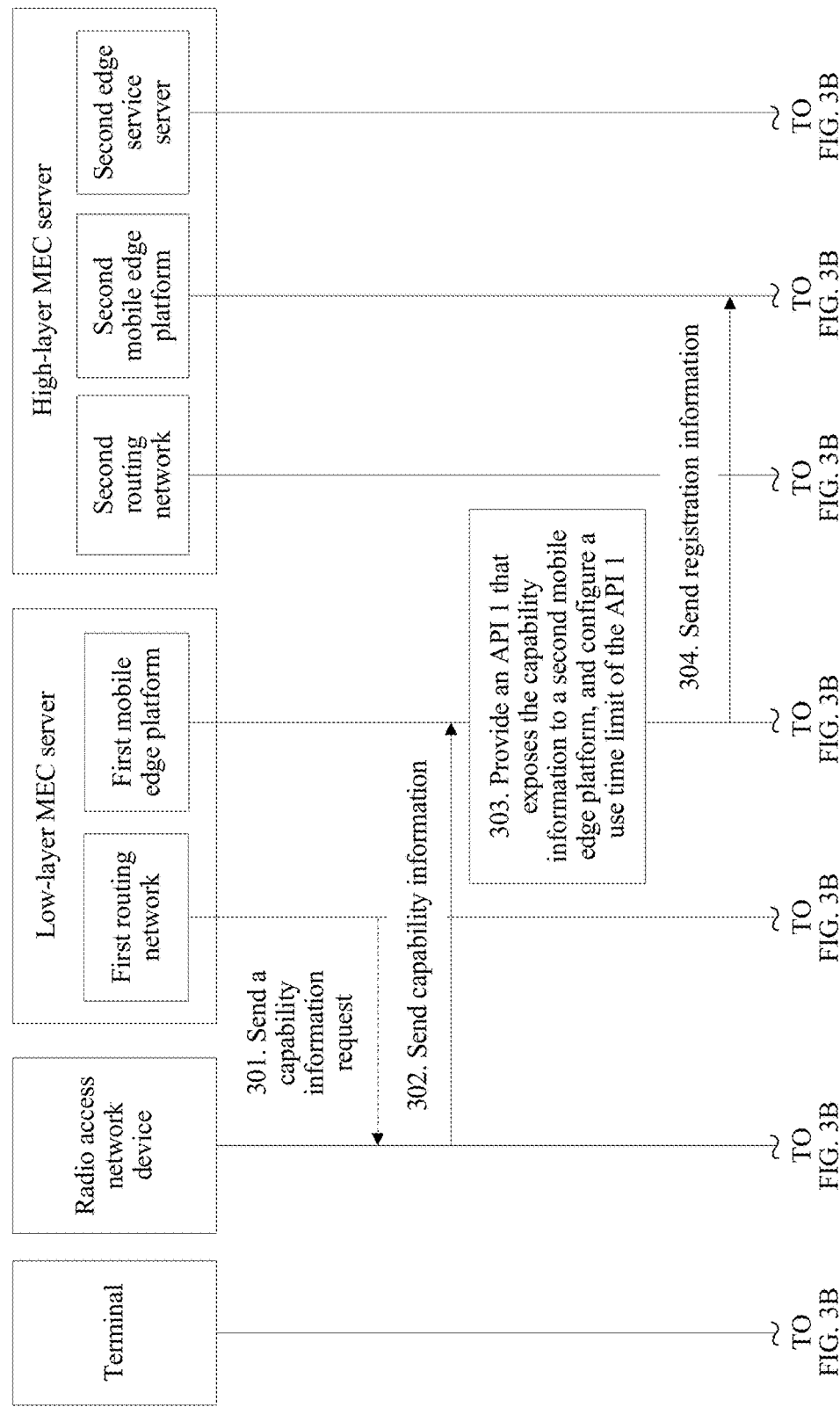
Figure 3C:
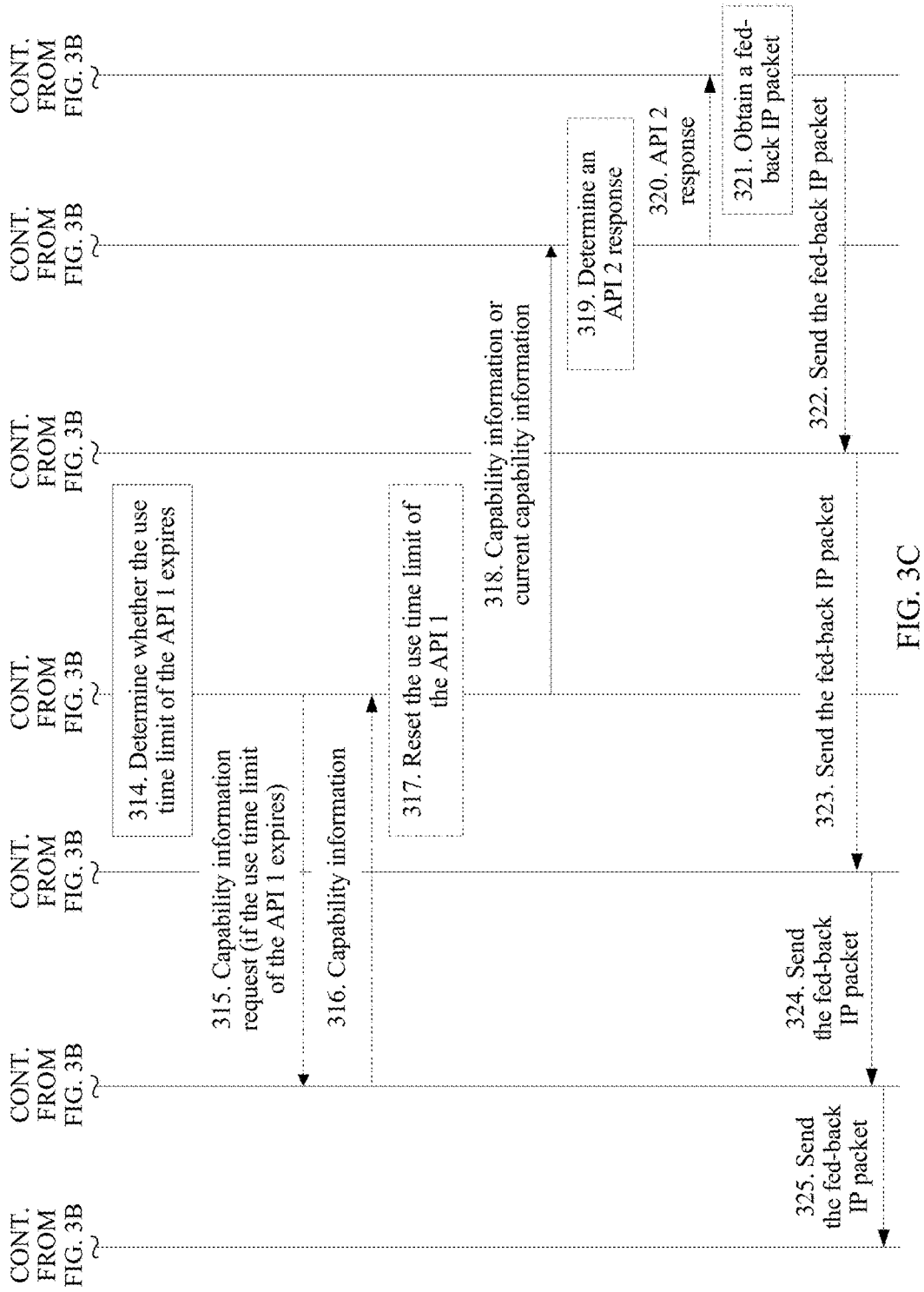

Referring to FIG. 3A to FIG. 3C, FIG. 3A to FIG. 3C are a signaling diagram of a capability exposure implementation method according to an embodiment of the present invention. As shown in FIG. 3A to FIG. 3C, the capability exposure implementation method may include the following steps.

301. A first mobile edge platform sends a capability information request to a radio access network device by using a first routing network.

The radio access network device includes an RNC, an eNodeB, a BSC, or the like. The first mobile edge platform first sends the capability information request to the first routing network, and the first routing network forwards the capability information request.

302. The radio access network device receives the capability information request, and sends capability information to the first mobile edge platform by using the first routing network.

The capability information includes a channel signal state, cell load, terminal location information, network congestion, and a terminal identity.

303. The first mobile edge platform receives the capability information, provides an API 1 that exposes the capability information to a second mobile edge platform, and configures a use time limit of the API 1.

Because the first mobile edge platform has a location advantage of being close to the radio access network device, the first mobile edge platform can obtain capability information of the radio access network device from the radio access network device (that is, the radio access network device exposes the capability information to the first mobile edge platform), and then stores the capability information. The first mobile edge platform provides the API 1 for the obtained capability information, and further exposes the capability information of the radio access network device to the second mobile edge platform by using the API 1. The second mobile edge platform may provide the capability information for a second edge service server.

Because the capability information of the radio access network device may also be updated, a use time limit of the API 1 needs to be set, that is, the API 1 is invalid after a use time limit.

It may be further understood that both the capability information request sent by the first mobile edge platform to the radio access network device and the capability information returned by the radio access network device are considered as signaling, and are transmitted on a signaling interface between the first routing network and the radio access network device.

304. The first mobile edge platform sends registration information to the second mobile edge platform, where the registration information includes an identifier of the API 1, and an ID of the first mobile edge platform and/or an ID of the radio access network device.

It should be noted that, in this embodiment of the present invention, when cascaded MEC servers are deployed, an association relationship between the first mobile edge platform, the second mobile edge platform, and the radio access network device is set on the second mobile edge platform. The registration information includes the identifier of the API 1, so as to notify the second mobile edge platform that the capability information will be provided for the second edge service server by using the API 1 later. Certainly, the registration information may further include the ID of the first mobile edge platform and/or the ID of the radio access network device, so that the second mobile edge platform can clearly determine a to-be-invoked API 1 when the second mobile edge platform needs to obtain the capability information from the first mobile edge platform.

The identifier of the API 1 may be a URL or a URI.

305. The second mobile edge platform receives the registration information, provides an API 2, establishes a correspondence between the API 1 and the API 2, and exposes the API 2 to a second edge service server.

It should be noted that after the second mobile edge platform receives and stores the registration information, when a high-layer MEC server is enabled, the second edge service server initiates, to the second edge platform, a request for searching for the API 2, and then the second edge platform feeds back information carrying an identifier of the API 2 to the second edge service server.

306. A terminal sends an IP packet to the radio access network device.

307. The radio access network device forwards the IP packet to the first routing network.

The radio access network device sends the IP packet to the first routing network by using a data interface.

308. The first routing network forwards the IP packet to a second routing network.

309. The second routing network forwards the IP packet to the second edge service server.

310. The second edge service server obtains the ID of the radio access network device and/or the ID of the first mobile edge platform from the second mobile edge platform, and then determines the API 2.

It should be noted that, in this embodiment of the present invention, a channel used to transmit the IP packet carries the ID of the radio access network device, and the second mobile edge platform may obtain, according to a pre-configuration, the ID of the radio access network device and/or the ID of the first mobile edge platform that are/is corresponding to the IP packet, and then send the ID of the radio access network device and/or the ID of the first mobile edge platform to the second edge service server actively or when the second edge service server makes a request.

311. The second edge service server sends an API 2 request to the second mobile edge platform, where the API 2 request includes an identifier of the API 2, and the ID of the radio access network device and/or the ID of the first mobile edge platform.

The identifier of the API 2 may be a URL or a URI.

The API 2 request in this embodiment of the present invention is a trigger request provided in another embodiment, and is used to trigger the second mobile edge platform to request the capability information from the first mobile edge platform.

312. The second mobile edge platform determines the API 1 according to the ID of the radio access network device and/or the ID of the first mobile edge platform.

The second mobile edge platform determines, according to the ID of the radio access network device and/or the ID of the first mobile edge platform, the API 1 used to expose the capability information (because the registration information includes the ID of the first mobile edge platform or the ID of the radio access network device, and the identifier of the API 1).

313. The second mobile edge platform sends an API 1 request to the first mobile edge platform, where the API 1 request includes the identifier of the API 1.

314. The first mobile edge platform determines whether the use time limit of the API 1 expires.

315. If the use time limit of the API 1 expires, the first mobile edge platform sends the capability information request to the radio access network device.

316. The radio access network device receives the capability information request, and sends the capability information to the first mobile edge platform.

It should be noted that the capability information herein is current capability information of the radio access network device, and the current capability information is latest capability information obtained before the first mobile edge platform receives the current capability information, and may be the same as or different from the capability information obtained in step 301.

317. The first mobile edge platform receives the capability information, and resets the use time limit of the API 1.

318. If the use time limit of the API 1 does not expire, or after re-obtaining current capability information from the radio access network device, the first mobile edge platform sends an API 1 response to the second mobile edge platform, where the API 1 response includes the capability information or the current capability information.

319. The second mobile edge platform receives the API 1 response, and then obtains an API 2 response, where the API 2 response includes the capability information included in the API 1 response.

It may be understood that the first mobile edge platform sends the API 1 response to the second mobile edge platform by using the API 1, and then the second mobile edge platform sends the API 1 response to the second edge service server by using the API 2.

320. The second mobile edge platform sends the API 2 response to the second edge service server.

321. After receiving the API 2 response, the second edge service server processes the IP packet to obtain a fed-back IP packet.

322. The second edge service server sends the fed-back IP packet to the second routing network.

323. The second routing network sends the fed-back IP packet to the first routing network.

324. The first routing network forwards the fed-back IP packet to the radio access network device.

325. The radio access network device sends the fed-back IP packet to the terminal.

An in-band mode is mainly used in this embodiment of the present invention. In this embodiment, the first mobile edge platform exposes the capability information of the radio access network device to the second mobile edge platform.

Further, in this embodiment of the present invention, the second mobile edge platform sends the API 1 request to the first mobile edge platform because the second edge service server receives the IP packet of the terminal, determines the API 2, obtains the ID of the radio access network device and/or the ID of the first mobile edge platform that are/is corresponding to the IP packet from the second mobile edge platform, and then requests the capability information from the second mobile edge platform. The first mobile edge platform obtains the capability information of the radio access network device by using a geographical location advantage that the first mobile edge platform is close to the radio access network device, and then the second mobile edge platform exposes the capability information to the second edge service server by using a geographical location advantage of the second mobile edge platform, that is, may obtain the capability information of the radio access network device, so as to reduce a delay, perform fast access, improve QoE, and further provide mobility support.

The IP packet mentioned in all embodiments of the present invention includes a service request of the terminal, for example, the terminal requests location positioning or requests a video. That the terminal requests location positioning is used as an example. The terminal requests location information from an edge service server of a high-layer MEC server by sending the IP packet. After receiving the IP packet forwarded by the radio access network device and a low-layer MEC server, the edge service server obtains, by separately using an API 2 interface and an API 1 interface according to a location positioning request requested in the IP packet, capability information required for positioning a terminal location from a mobile edge platform of the low-layer MEC server, for example, terminal location information. Finally, a mobile edge platform of the high-layer MEC server generates the IP packet according to the terminal location information, and feeds back the IP packet to the terminal.

Figure 4A:
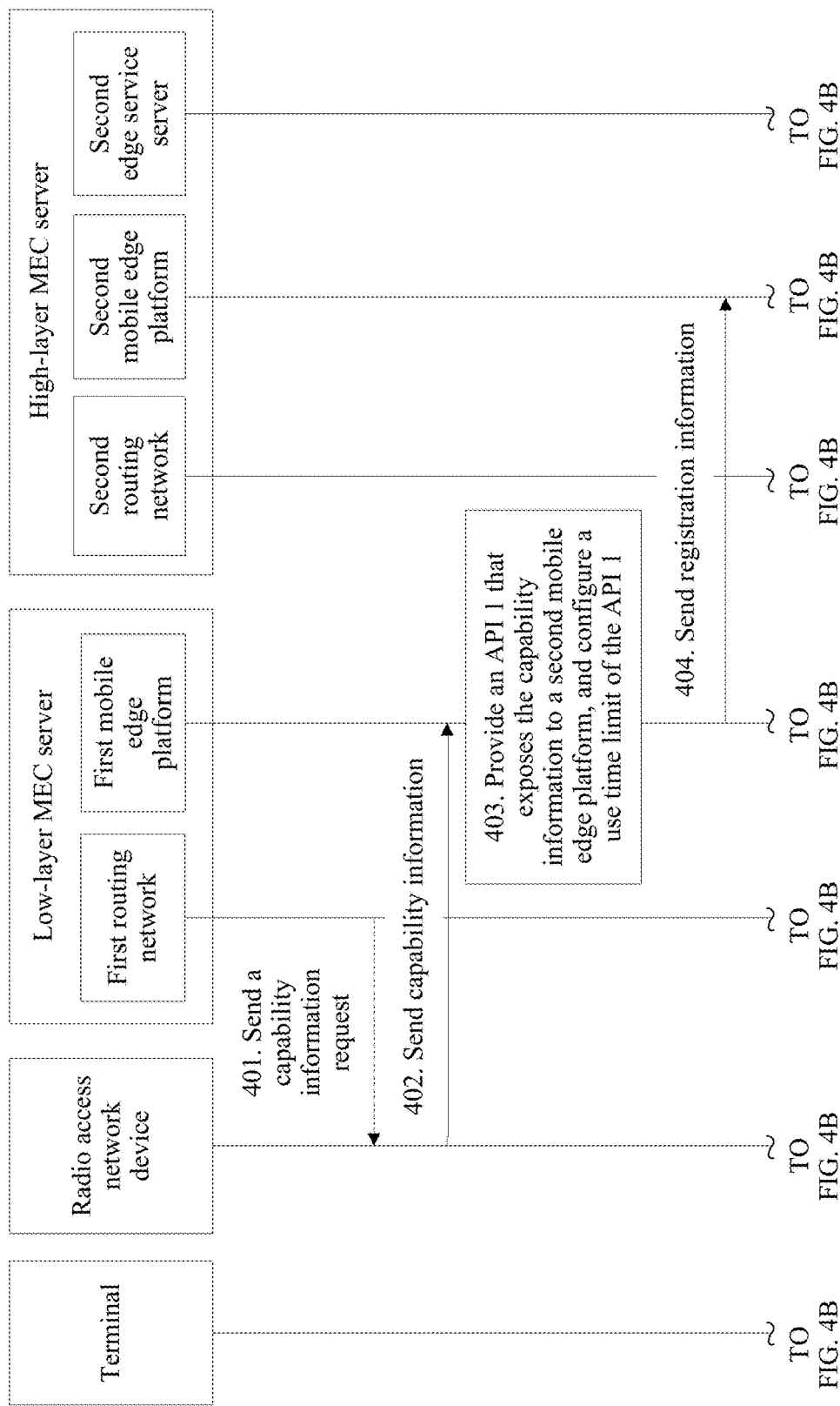
Figure 4C:
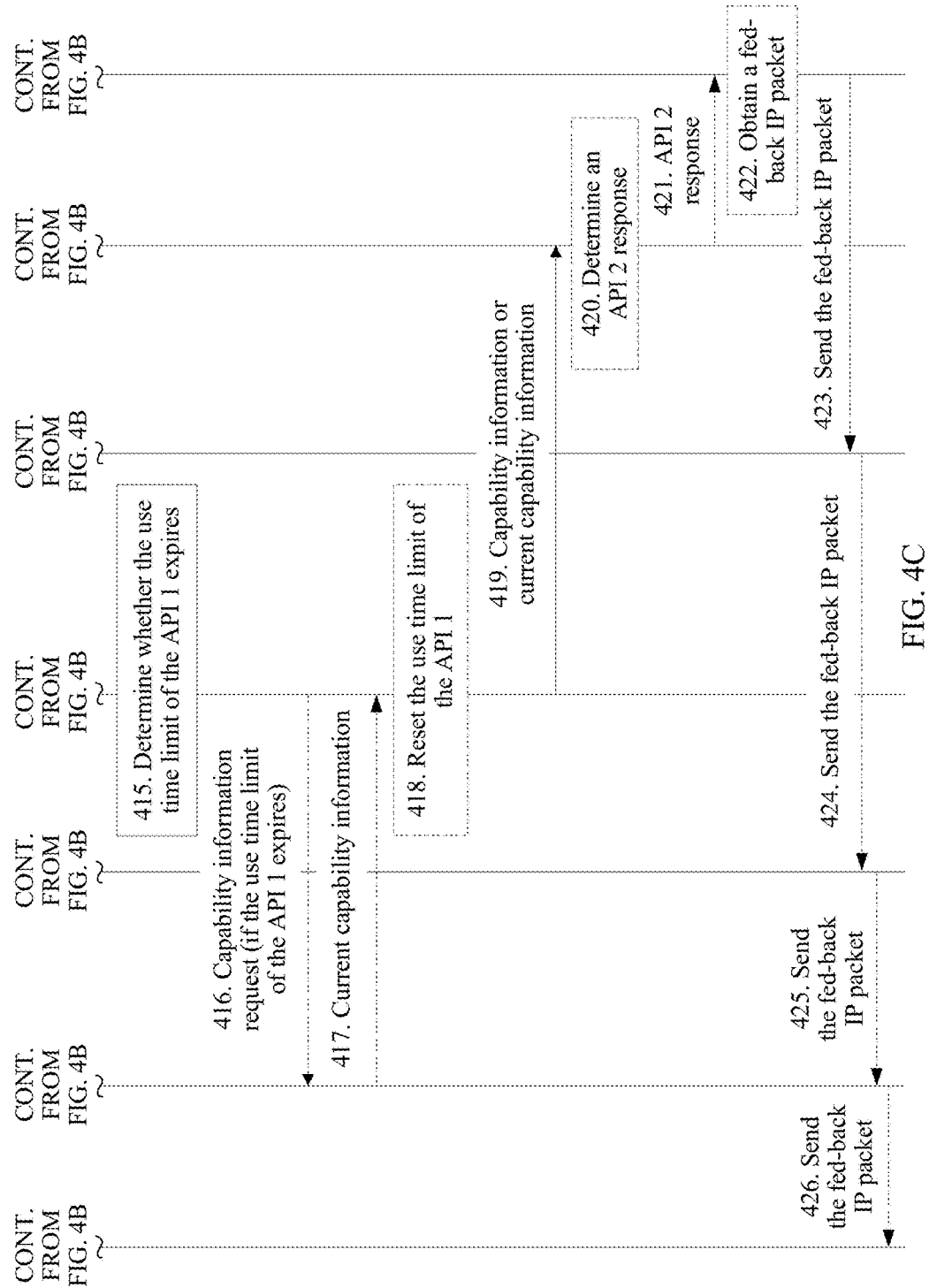

Referring to FIG. 4A to FIG. 4C, FIG. 4A to FIG. 4C are another signaling diagram of a capability exposure implementation method according to an embodiment of the present invention. As shown in FIG. 4A to FIG. 4C, the capability exposure implementation method may include the following steps.

Steps 401 to 407 are the same as steps 301 to 307, and are not described in detail herein again.

408. The first routing network forwards the IP packet to the radio access network device.

409. The radio access network device forwards the IP packet to a second routing network.

Steps 410 to 426 are the same as steps 309 to 325, and are not described in detail herein again.

An out-of-band mode is applied to this embodiment of the present invention. Therefore, in this embodiment of the present invention, a routing network of a low-layer MEC server cannot directly forward the IP packet to a routing network of a high-layer MEC server, and the radio access network device needs to forward the IP packet to the routing network of the high-layer MEC server.

It should be further noted that, in this embodiment of the present invention, the second mobile edge platform sends the API 1 request to the first mobile edge platform because the second edge service server receives the IP packet of the terminal, obtains the ID of the first mobile edge platform and/or the ID of the radio access network device from the second mobile edge platform, then determines the API 2, and sends the API 2 request to the second mobile edge platform.

Figure 5A:
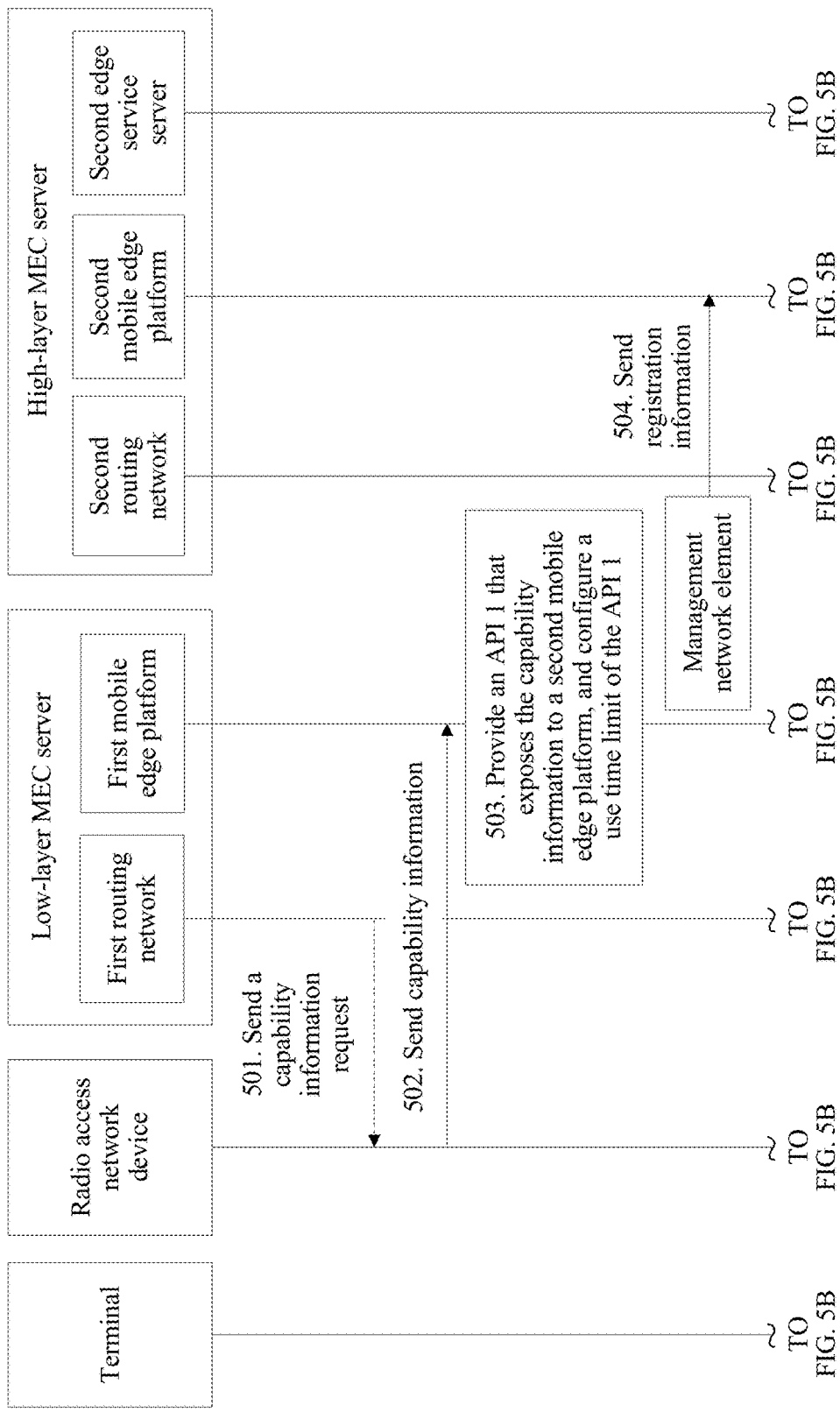
FIG. 5A to FIG. 5C are another signaling diagram of a capability exposure implementation method according to some embodiments of the present invention.
Figure 5B:
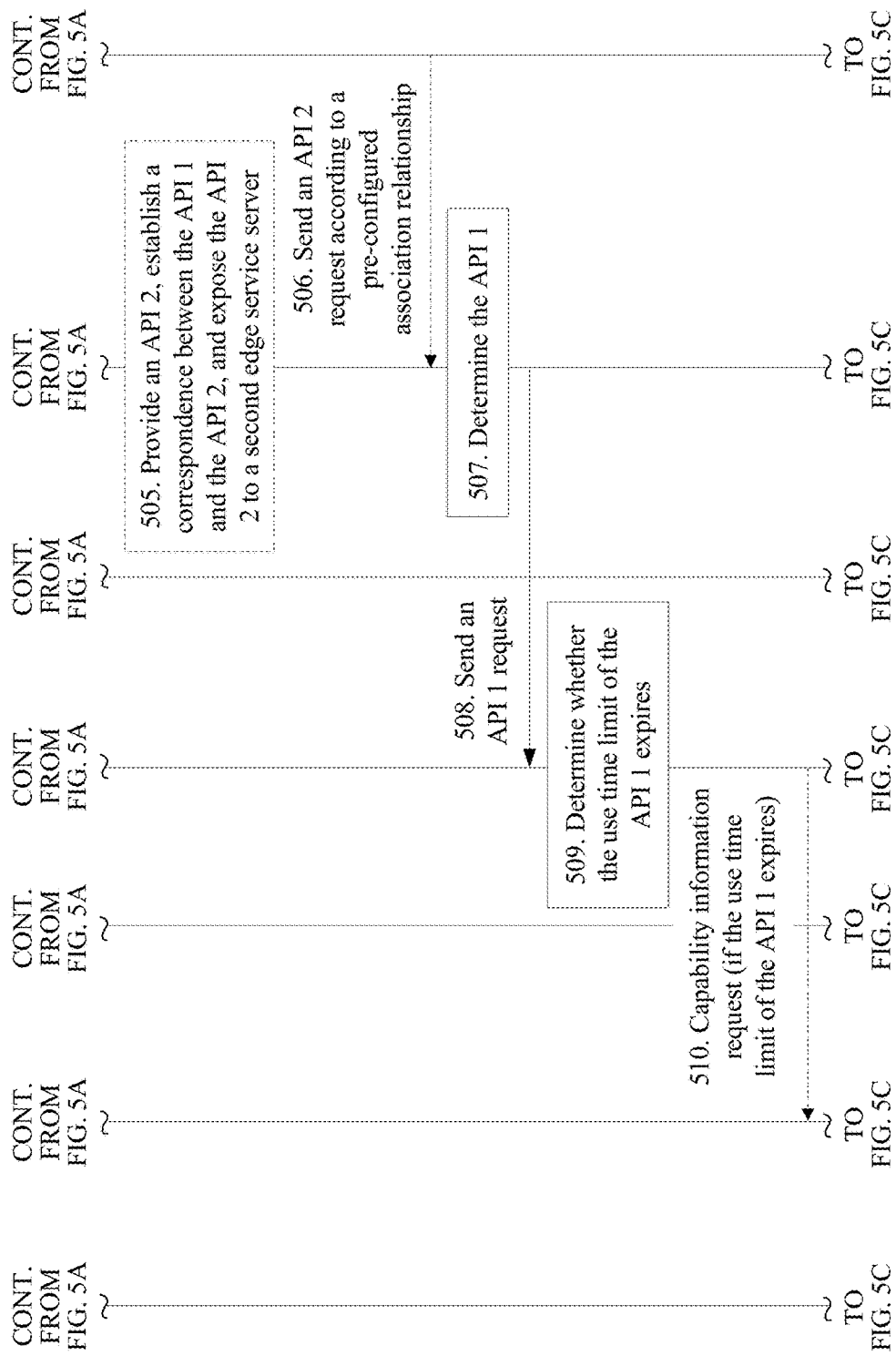
Figure 5C:
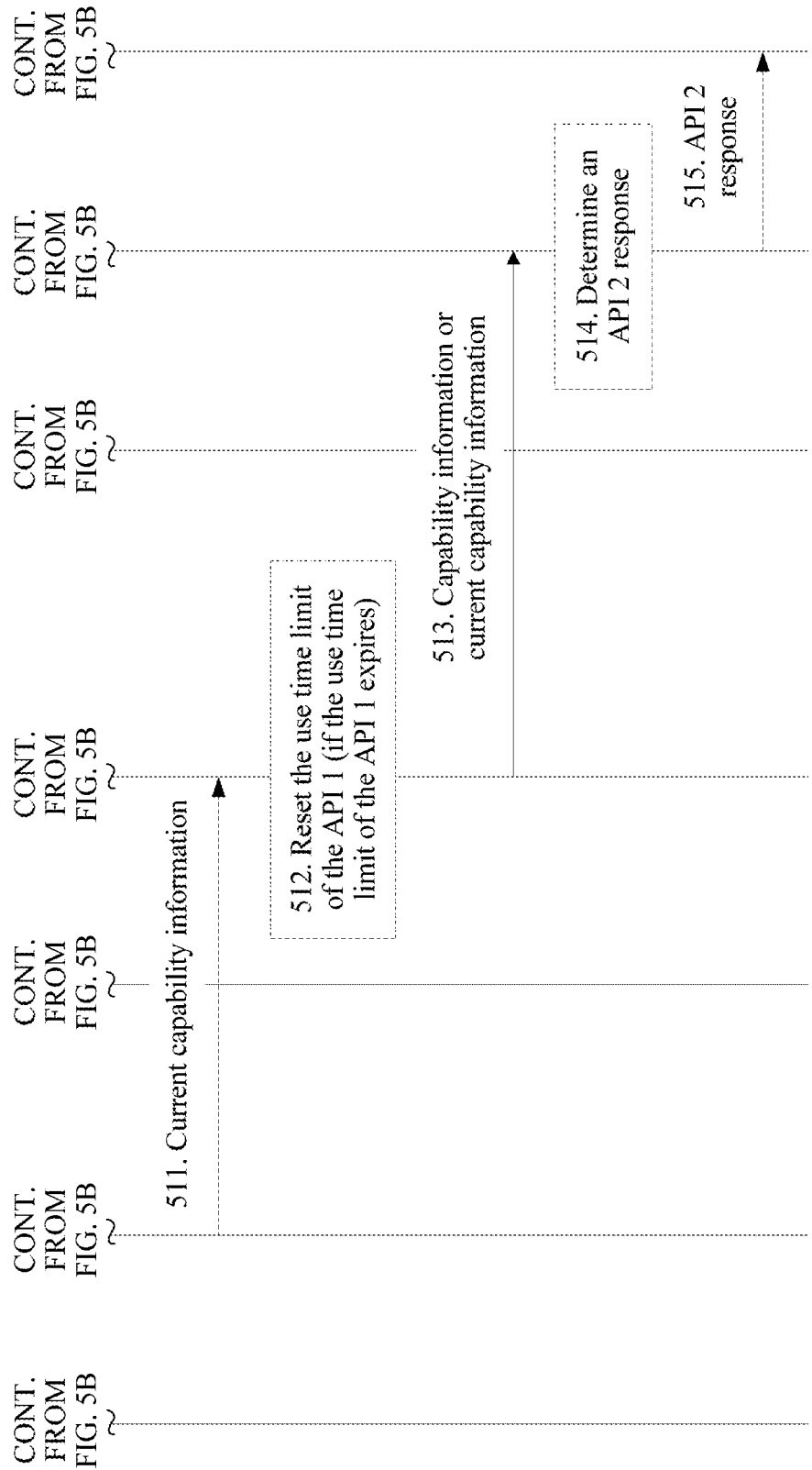

Referring to FIG. 5A to FIG. 5C, FIG. 5A to FIG. 5C are another signaling diagram of a capability exposure implementation method according to an embodiment of the present invention. As shown in FIG. 5A to FIG. 5C, the capability exposure implementation method may include the following steps.

Steps 501 to 503 are the same as steps 301 to 303, and are not described in detail herein again.

504. A management network element sends registration information to the second mobile edge platform.

In the embodiments shown in FIG. 3A to FIG. 3C and FIG. 4A to FIG. 4C, the mobile edge platform of the low-layer MEC server actively sends the registration information to the mobile edge platform of the high-layer MEC server. In this embodiment of the present invention, a mobile edge platform of a low-layer MEC server triggers the management network element to send the registration information.

Step 505 is the same as step 305.

506. The second edge service server sends an API 2 request to the second mobile edge platform.

It should be noted that, in the present invention, the second edge service server actively initiates the API 2 request instead of being triggered after receiving an IP packet of a terminal. The second edge service server may determine the API 2 according to a pre-configured association relationship. The pre-configured association relationship includes an association relationship between the radio access network device, the first mobile edge platform, and the second mobile edge platform, and further includes an association relationship between the API 2 and the API 1.

Steps 507 to 515 are the same as steps 312 to 320.

An in-band mode or an out-of-band mode may be applied to this embodiment of the present invention. In this embodiment of the present invention, the management network element sends the registration information, and the management network element includes a mobile edge manager, a mobile edge orchestrator, and the like. However, an edge service server of a high-layer MEC server actively initiates the API 2 request without receiving the IP packet, so as to request the capability information. When actively initiating the API 2 request, the high-layer MEC server may obtain an ID of the radio access network device and/or an ID of the first mobile edge platform from a pre-configured file or from the second mobile edge platform.

Figure 6:
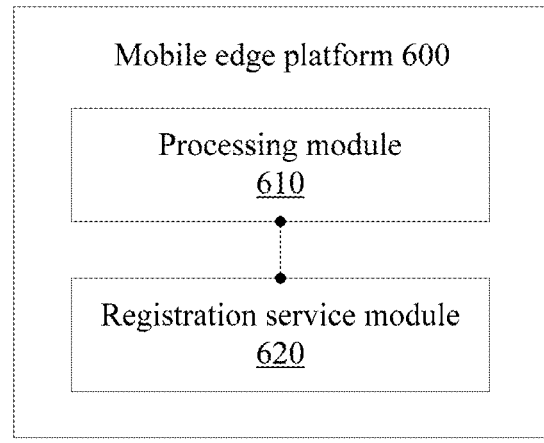
FIG. 6 is a schematic structural diagram of a mobile edge platform according to some embodiments of the present invention.

Referring to FIG. 6, FIG. 6 is a schematic structural diagram of a mobile edge platform according to an embodiment of the present invention. As shown in FIG. 6, the mobile edge platform 600 may include:

a processing module 610, configured to: obtain capability information of a radio access network device, configure an application programming interface API, and set a use time limit of the API, where the API is used by the mobile edge platform to provide the capability information for a second mobile edge platform; and a registration service module 620, configured to trigger a registration function to send registration information to the second mobile edge platform, where the registration information includes an identifier of the API.

The processing module 610 is further configured to: receive an API request sent by the second mobile edge platform, where the API request includes the identifier of the API, and the API request is used to request the capability information from the mobile edge platform; detect whether the use time limit of the API expires; and when detecting that the use time limit of the API does not expire, send an API response to the second mobile edge platform by using the API, where the API response includes the capability information.

Optionally, the capability information includes a channel signal state, cell load, terminal location information, network congestion, and a terminal identity.

In some embodiments of the present invention, the processing module 610 is further configured to: when detecting that the use time limit of the API expires, obtain current capability information of the radio access network device, where the current capability information is capability information of the radio access network device at a current time; and reset the use time limit of the API, and send, by using the API, an API response including the current capability information to the second mobile edge platform.

In some embodiments of the present invention, the registration service module 620 is specifically configured to send the registration information to the second mobile edge platform.

In some embodiments of the present invention, the registration service module 620 is further specifically configured to trigger a management network element to send the registration information to the second mobile edge platform by using the management network element.

In some embodiments of the present invention, the processing module 610 is further configured to provide the capability information for a first edge service server by using the API, where the first edge service server and the mobile edge platform are disposed in a first Mobile Edge Computing MEC server.

Figure 7:
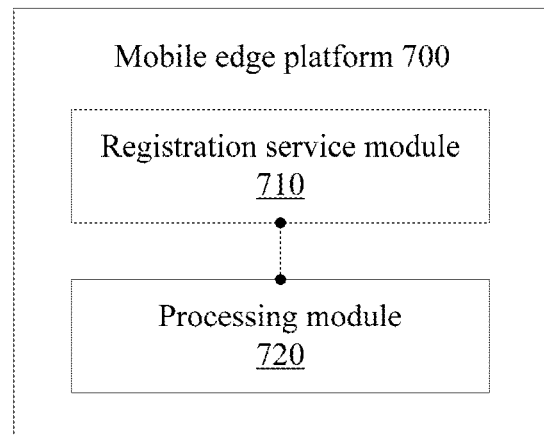
FIG. 7 is a schematic structural diagram of a mobile edge platform according to some other embodiments of the present invention.

Referring to FIG. 7, FIG. 7 is another schematic structural diagram of a mobile edge platform according to some embodiments of the present invention. As shown in FIG. 7, the mobile edge platform 700 may include:

a registration service module 710, configured to receive registration information, where the registration information includes an identifier of an application programming interface API, the API is used by a first mobile edge platform to provide capability information for the mobile edge platform, and the capability information is capability information of a radio access network device; and a processing module 720, configured to: send an API request to the first mobile edge platform, where the API request includes the identifier of the API, and the API request is used to request the capability information from the first mobile edge platform; and receive an API response sent by the first mobile edge platform, where the API response includes the capability information.

Optionally, the capability information includes a channel signal state, cell load, terminal location information, network congestion, and a terminal identity.

In some embodiments of the present invention, the processing module 720 is further configured to: before sending the API request to the first mobile edge platform, receive a trigger request sent by a second edge service server, where the trigger request includes an identity ID of the radio access network device and/or an ID of the first mobile edge platform, the trigger request is used to trigger the mobile edge platform to send the API request to the first mobile edge platform, and the second edge service server and the mobile edge platform are disposed in a second Mobile Edge Computing MEC server; and determine the API according to the identity ID of the radio access network device and/or the ID of the first mobile edge platform.

In some embodiments of the present invention, the processing module 720 is further configured to: after receiving the API response sent by the first mobile edge platform, provide the capability information for the second edge service server.

In some embodiments of the present invention, the processing module 720 is specifically configured to receive the registration information sent by the first mobile edge platform.

In some embodiments of the present invention, the processing module 720 is specifically configured to receive the registration information sent by a management network element.

Figure 8:
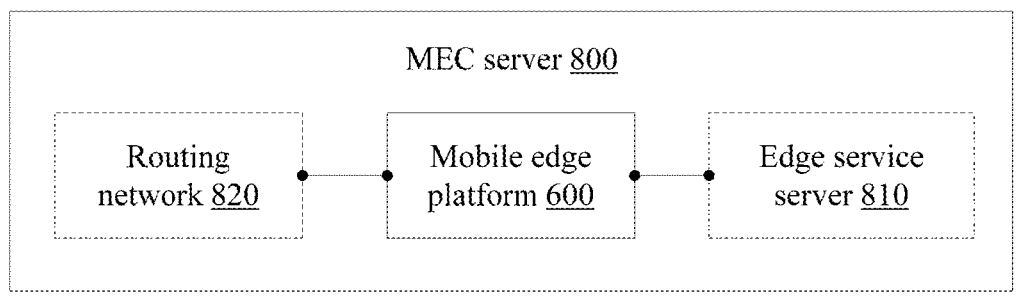
FIG. 8 is a schematic structural diagram of an MEC server according to some embodiments of the present invention.

Referring to FIG. 8, FIG. 8 is a schematic structural diagram of an MEC server according to an embodiment of the present invention. As shown in FIG. 8, the MEC server 800 includes the mobile edge platform 600.

The mobile edge platform 600 is the first mobile edge platform described in this embodiment of the present invention.

Further, the MEC server 800 includes an edge service server 810, for example, the first edge service server described above.

Further, the MEC server 800 includes a routing network 820. The routing network 820 is specifically the first routing network provided in this embodiment of the present invention.

Figure 9:
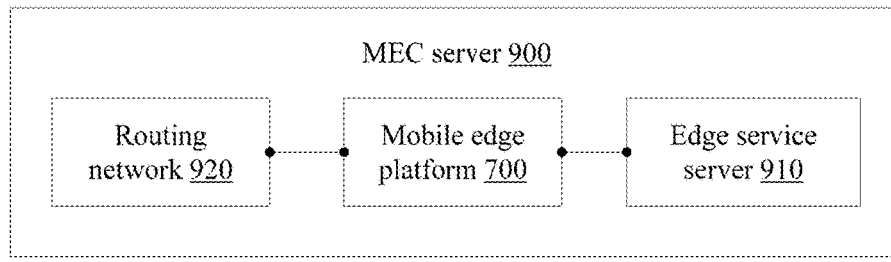
FIG. 9 is a schematic structural diagram of an MEC server according to some other embodiments of the present invention.

Referring to FIG. 9, FIG. 9 is a schematic structural diagram of an MEC server according to some other embodiments of the present invention. As shown in FIG. 9, the MEC server 900 includes the mobile edge platform 700.

The mobile edge platform 700 is the second mobile edge platform described in this embodiment of the present invention.

Further, the MEC server 900 includes an edge service server 910, for example, the second edge service server described above.

Further, the MEC server 900 includes a routing network 920. The routing network 920 is specifically the second routing network provided in this embodiment of the present invention.

Figure 10:
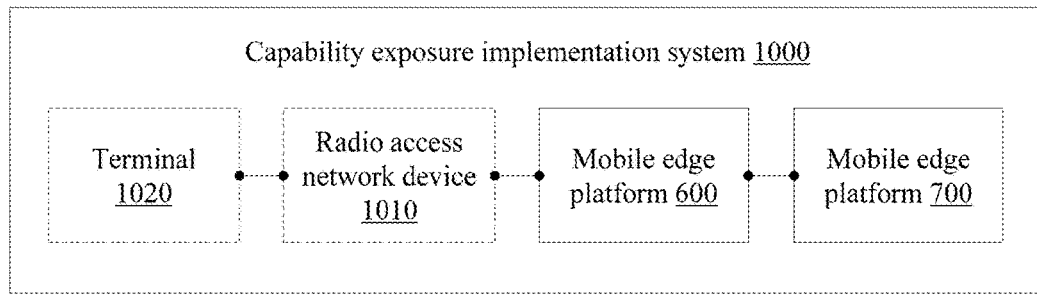
FIG. 10 is a schematic structural diagram of a capability exposure implementation system according to some embodiments of the present invention.

Referring to FIG. 10, FIG. 10 is a schematic structural diagram of a capability exposure implementation system according to an embodiment of the present invention. As shown in FIG. 10, the capability exposure implementation system 1000 may include:

the mobile edge platform 600 shown in FIG. 6 and the mobile edge platform 700 shown in FIG. 7.

Further, the capability exposure implementation system 1000 includes a radio access network device 1010. The radio access network device 1010 is configured to provide capability information to the first mobile edge platform.

Still further, the capability exposure implementation system 1000 includes a terminal 1020. For specific content of the terminal 1020, refer to a description of the foregoing method embodiment.

Figure 11:
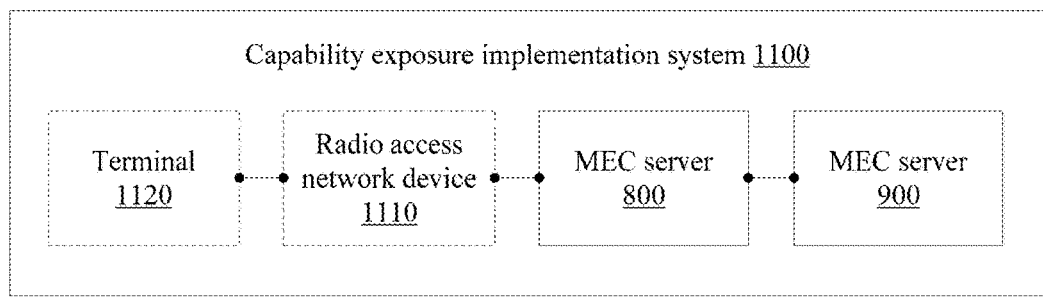
FIG. 11 is a schematic structural diagram of a capability exposure implementation system according to some other embodiments of the present invention.

Referring to FIG. 11, FIG. 11 is a schematic structural diagram of a capability exposure implementation system according to an embodiment of the present invention. As shown in FIG. 11, the capability exposure implementation system 1100 may include:

the MEC server 800 shown in FIG. 8, the MEC server 900 shown in FIG. 9, and a radio access network device 1110.

Further, the capability exposure implementation system 1100 includes a terminal 1120. For specific content, refer to a description of the foregoing method embodiment.

Figure 12:
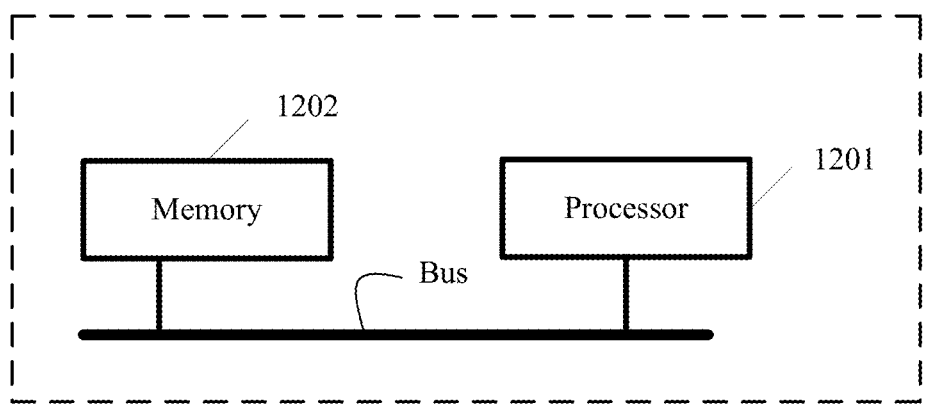
FIG. 12 is a schematic structural diagram of a capability exposure implementation apparatus according to an embodiment of the present invention.

Referring to FIG. 12, FIG. 12 is a schematic structural diagram of a capability exposure implementation apparatus according to an embodiment of the present invention. The capability exposure implementation apparatus may include at least one processor 1201 (for example, a CPU, Central Processing Unit), at least one network interface or another communications interface, a memory 1202, and at least one communications bus that is configured to implement connection and communication between these apparatuses. The processor 1201 is configured to execute an executable module stored in the memory, for example, a computer program. The memory 1202 may include a high-speed random access memory (RAM), or may include a non-volatile memory (non-volatile memory), for example, at least one magnetic disk memory. The at least one network interface (which may be wired or wireless) is used to implement a communications connection between a system gateway and at least one another network element by using the Internet, a wide area network, a local area network, a metropolitan area network, or the like.

As shown in FIG. 12, in some implementations, the memory 1202 stores a program instruction, where the program instruction may be executed by the processor 1201. The processor 1201 specifically performs the following steps: obtaining capability information of a radio access network device, configuring an application programming interface API, and setting a use time limit of the API, where the API is used by a mobile edge platform to provide the capability information for a second mobile edge platform; triggering a registration function to send registration information to the second mobile edge platform, where the registration information includes an identifier of the API; receiving an API request sent by the second mobile edge platform, where the API request includes the identifier of the API, and the API request is used to request the capability information from the mobile edge platform; detecting whether the use time limit of the API expires; and when detecting that the use time limit of the API does not expire, sending an API response to the second mobile edge platform by using the API, where the API response includes the capability information.

Alternatively, the processor 1201 specifically performs the following steps: receiving registration information, where the registration information includes an identifier of an application programming interface API, the API is used by a first mobile edge platform to provide capability information for the mobile edge platform, and the capability information is capability information of a radio access network device; sending an API request to the first mobile edge platform, where the API request includes the identifier of the API, and the API request is used to request the capability information from the first mobile edge platform; and receiving an API response sent by the first mobile edge platform, where the API response includes the capability information.

In some implementations, the processor 1201 may further perform the following steps: when detecting that the use time limit of the API expires, obtaining current capability information of the radio access network device, where the current capability information is capability information of the radio access network device at a current time; and resetting the use time limit of the API, and sending, by using the API, an API response including the current capability information to the second mobile edge platform.

In some implementations, the processor 1201 may further perform the following step: sending the registration information to the second mobile edge platform.

In some implementations, the processor 1201 may further perform the following step: triggering a management network element to send the registration information to the second mobile edge platform by using the management network element.

In some implementations, the processor 1201 may further perform the following step: providing the capability information for a first edge service server by using the API, where the first edge service server and the mobile edge platform are disposed in a first Mobile Edge Computing MEC server.

In some implementations, the processor 1201 may further perform the following steps: before sending the API request to the first mobile edge platform, receiving a trigger request sent by a second edge service server, where the trigger request includes an identity ID of the radio access network device and/or an ID of the first mobile edge platform, the trigger request is used to trigger the mobile edge platform to send the API request to the first mobile edge platform, and the second edge service server and the mobile edge platform are disposed in a second Mobile Edge Computing MEC server; and determining the API according to the identity ID of the radio access network device and/or the ID of the first mobile edge platform.

In some implementations, the processor 1201 may further perform the following step: after receiving the API response sent by the first mobile edge platform, providing the capability information for the second edge service server.

In some implementations, the processor 1201 may further perform the following step: receiving the registration information sent by the first mobile edge platform.

In some implementations, the processor 1201 may further perform the following step: receiving the registration information sent by a management network element.

In the foregoing embodiments, the description of each embodiment has respective focuses. For a part that is not described in detail in an embodiment, reference may be made to related descriptions in other embodiments.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, function units in the embodiments of the present invention may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing describes in detail the capability exposure implementation method and system, and the related device provided in the present invention. A person of ordinary skill in the art may make modifications with respect to a specific implementation and an application scope according to the ideas of the embodiments of the present invention. In conclusion, content of this specification shall not be construed as a limitation on the present invention.

What is claimed is:

1. A capability exposure implementation method, comprising:
   obtaining, by a first mobile edge platform, capability information of a radio access network device;
   configuring an application programming interface (API);
   setting a use time limit of the API, wherein the API is used by the first mobile edge platform to provide the capability information for a second mobile edge platform;
   triggering, by the first mobile edge platform, a registration function to send registration information to the second mobile edge platform, wherein the registration information comprises an identifier of the API;
   receiving, by the first mobile edge platform, an API request from the second mobile edge platform, wherein the API request comprises the identifier of the API, and the API request is used to request the capability information from the first mobile edge platform;
   detecting, by the first mobile edge platform, whether the use time limit of the API expires; and
   when the use time limit of the API does not expire, sending, by the first mobile edge platform, an API response to the second mobile edge platform by using the API, wherein the API response comprises the capability information.

2. The method according to claim 1, wherein the method further comprises:
   when the use time limit of the API expires, obtaining, by the first mobile edge platform, current capability information of the radio access network device, wherein the current capability information is capability information of the radio access network device at a current time;
   resetting, by the first mobile edge platform, the use time limit of the API; and
   sending, by using the API, an API response comprising the current capability information to the second mobile edge platform.

3. The method according to claim 1, wherein the triggering, by the first mobile edge platform, the registration function to send registration information to the second mobile edge platform comprises:
   sending, by the first mobile edge platform, the registration information to the second mobile edge platform.

4. The method according to claim 1, wherein the triggering, by the first mobile edge platform, the registration function to send registration information to the second mobile edge platform comprises:
   triggering, by the first mobile edge platform, a management network element to send the registration information to the second mobile edge platform by using the management network element.

5. The method according to claim 1, wherein the method further comprises:
   providing, by the first mobile edge platform, the capability information for a first edge service server by using the API, wherein the first edge service server and the first mobile edge platform are disposed in a first Mobile Edge Computing (MEC) server.

6. The method according to claim 1, wherein the capability information comprises at least one of a channel signal state, cell load, terminal location information, network congestion, or a terminal identity.

7. A capability exposure implementation method, comprising:
   receiving, by a second mobile edge platform, registration information, wherein the registration information comprises an identifier of an application programming interface (API), the API is used by a first mobile edge platform to provide capability information for the second mobile edge platform, and the capability information is capability information of a radio access network device;
   sending, by the second mobile edge platform, an API request to the first mobile edge platform, wherein the API request comprises the identifier of the API, and the API request is used to request the capability information from the first mobile edge platform; and
   receiving, by the second mobile edge platform, an API response from the first mobile edge platform, wherein the API response comprises the capability information.

8. The method according to claim 7, wherein before the sending, by the second mobile edge platform, the API request to the first mobile edge platform, the method comprises:

receiving, by the second mobile edge platform, a trigger request from a second edge service server, wherein the trigger request comprises at least one of an identity (ID) of the radio access network device or an ID of the first mobile edge platform, the trigger request is used to trigger the second mobile edge platform to send the API request to the first mobile edge platform, and the second edge service server and the second mobile edge platform are disposed in a second Mobile Edge Computing (MEC) server; and determining, by the second mobile edge platform, the API according to the at least one of the ID of the radio access network device or the ID of the first mobile edge platform.

9. The method according to claim 8, wherein after the receiving, by the second mobile edge platform, the API response from the first mobile edge platform, the method comprises:

providing, by the second mobile edge platform, the capability information for the second edge service server.

10. The method according to claim 7, wherein the receiving, by the second mobile edge platform, registration information comprises:

receiving, by the second mobile edge platform, the registration information from the first mobile edge platform.

11. The method according to claim 7, wherein the receiving, by the second mobile edge platform, registration information comprises:

receiving, by the second mobile edge platform, the registration information from a management network element.

12. The method according to claim 7, wherein the capability information comprises at least one of a channel signal state, cell load, terminal location information, network congestion, or a terminal identity.

13. A mobile edge platform, comprising:
at least one processor; and
a memory, wherein the memory stores a program instruction, and the at least one processor is configured to execute the program instruction stored in the memory to perform the following steps:
obtaining capability information of a radio access network device;
configuring an application programming interface API;
set a use time limit of the API, wherein the API is used by the mobile edge platform to provide the capability information for a second mobile edge platform;
triggering a registration function to send registration information to the second mobile edge platform, wherein the registration information comprises an identifier of the API;
receiving an API request from the second mobile edge platform, wherein the API request comprises the identifier of the API, and the API request is used to request the capability information from the mobile edge platform;
detecting whether the use time limit of the API expires; and
when detecting that the use time limit of the API does not expire, sending an API response to the second mobile edge platform by using the API, wherein the API response comprises the capability information.

14. The mobile edge platform according to claim 13, wherein the steps further comprises:

when detecting that the use time limit of the API expires, obtaining current capability information of the radio access network device, wherein the current capability information is capability information of the radio access network device at a current time;
resetting the use time limit of the API; and
sending, by using the API, an API response comprising the current capability information to the second mobile edge platform.

15. The mobile edge platform according to claim 13, wherein the steps further comprises:

sending the registration information to the second mobile edge platform; or
triggering a management network element to send the registration information to the second mobile edge platform by using the management network element.

16. The mobile edge platform according to claim 13, wherein the steps further comprises:

providing the capability information for a first edge service server by using the API, wherein the first edge service server and the mobile edge platform are disposed in a first Mobile Edge Computing (MEC) server.

17. A mobile edge platform, comprising:
at least one processor; and
a memory, wherein the memory stores a program instruction, and the at least one processor is configured to execute the program instruction stored in the memory to perform the following steps:
receiving registration information, wherein the registration information comprises an identifier of an application programming interface (API), the API is used by a first mobile edge platform to provide capability information for the mobile edge platform, and the capability information is capability information of a radio access network device;
sending an API request to the first mobile edge platform, wherein the API request comprises the identifier of the API, and the API request is used to request the capability information from the first mobile edge platform; and
receiving an API response from the first mobile edge platform, wherein the API response comprises the capability information.

18. The mobile edge platform according to claim 17, wherein the steps further comprises:

before sending the API request to the first mobile edge platform, receiving a trigger request from a second edge service server, wherein the trigger request comprises at least one of an identity (ID) of the radio access network device or an ID of the first mobile edge platform, the trigger request is used to trigger the mobile edge platform to send the API request to the first mobile edge platform, and the second edge service server and the mobile edge platform are disposed in a second Mobile Edge Computing (MEC) server; and
determining the API according to the at least one of the ID of the radio access network device or the ID of the first mobile edge platform.

19. The mobile edge platform according to claim 18, wherein the steps further comprises:

after receiving the API response from the first mobile edge platform, providing the capability information for the second edge service server.

20. The mobile edge platform according to claim 17, wherein the steps further comprises:

receiving the registration information from the first mobile edge platform; or receiving the registration information from a management network element.

\* \* \* \* \*